US008554825B2

(12) United States Patent
Falchuk et al.

(10) Patent No.: US 8,554,825 B2
(45) Date of Patent: Oct. 8, 2013

(54) METHOD FOR SYSTEMATIC MODELING AND EVALUATION OF APPLICATION FLOWS

(75) Inventors: Benjamin W. Falchuk, Upper Nyack, NY (US); Komandur R. Krishnan, Bridgewater, NJ (US); Shoshana K. Loeb, Philadelphia, PA (US); David F. Shallcross, Piscataway, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 867 days.

(21) Appl. No.: 11/441,531

(22) Filed: May 26, 2006

(65) Prior Publication Data

US 2007/0150322 A1 Jun. 28, 2007

Related U.S. Application Data

(60) Provisional application No. 60/753,179, filed on Dec. 22, 2005.

(51) Int. Cl.
*G06F 9/44* (2006.01)
(52) U.S. Cl.
USPC .......................................................... 709/200
(58) Field of Classification Search
USPC ................ 705/7; 709/200, 204–207; 370/252
See application file for complete search history.

(56) References Cited

U.S. PATENT DOCUMENTS

2004/0083199 A1* 4/2004 Govindugari et al. ............ 707/1

OTHER PUBLICATIONS

IEEE publication titled "Sensitivity of Wireless Network Simulation to a Two-State Markov Model Channel Approximation", by McDougall et al, Globecom 2003.*
IEEE publication "Lumpable Hidden Markov Models—Model Reduction and Reduced Complexity Filtering" authored White et al, Dec. 2000.*
ACM publication titled "Discovering Models of Software Processes from Event-Based Data" by Cook et al, Jul. 1998.*
IEEE publication titled "Internetworking of IP Multimedia Core Networks Between 3GPP and WLAN" by Marquez et al, Jun. 2005.*
Yan et al, "Automatic Generation of Markov Chain Usage Models from Real-time Software UML Models", Fourth International Conference on Quality Software, QSIC 2004.*
Lindemann et al, "Performance Analysis of Time-enchanced UML Diagrams Based on Stochastic Processes", Third International Workshop on Software and Performance, 2002.*
L.B. Arief and N.A. Speirs, "A UML Tool for an Automatic Generation of Simulation Programs", Sep. 2000, University of Newcastle upon Tyne Newcastle upon Tyne NE1 7Ru, England.*
King et al, "Derivation of Petri Net Performance Models from UML Specifications of Communications Software", B.R. Haverkort et al. (Eds.): TOOLS 2000, LNCS 1786, pp. 262-276.*

(Continued)

*Primary Examiner* — Thai Nguyen
(74) *Attorney, Agent, or Firm* — Philip J. Feig

(57) ABSTRACT

A system and method for modeling and evaluating resource requirements of services is disclosed. The system and method in one aspect enable describing an application session in a software model, for example, as a sequence of events in a sequence diagram, annotating the sequence diagram with information and using the sequence diagram and the information to create a mathematical model such as a Markov model that represents the application session. Once in Markov form the service can be analyzed. The system may include a user interface for allowing a user to enter annotations to the sequence diagram.

7 Claims, 30 Drawing Sheets

(56) References Cited

OTHER PUBLICATIONS

I.Khriss, M.Elkoutbi, R.Keller, "Automating the Synthesis of UML Statechart Diagrams from Multiple Collaboration Diagrams", Proc. UML'98,Mulhouse, Jun. 1998.

I.Kruger, R.Grosu, P.Scholz, M.Broy, "From MCS's to Statecharts", Distributed and Parallel Embedded Systems, pp. 61-71. Kluwer Academic Publishers, 1999.

T.Ziadi, L.Helouet, J.Jezequel, "Revisiting Statechart Synthesis with an Algebraic Approach", Proc. IEEE Int'l Conf on Software Engineering, 2004.

Z.Kohavi, Switching and Finite Automata Theory, McGraw-Hill, Chapter 10, pp. 322-355, New York, 1978.

J. Hopcroft: "An N log N Algorithm for Minimizing States in a Finite Automaton", Theory of Machines and Computation, Kohavi (ed.), pp. 189-196, Academic Press, 1971.

* cited by examiner

FIG. 17
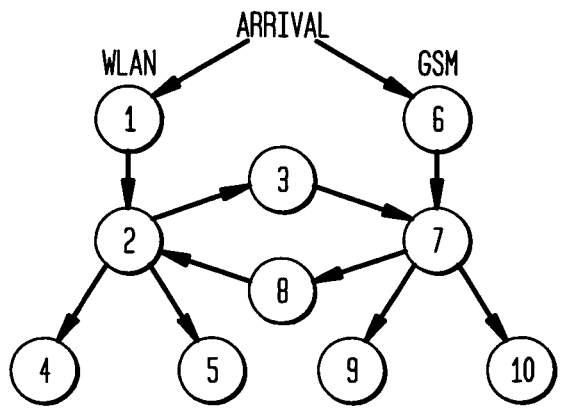
FIG. 18
| STATE | $l_i$ | $d_i$ | $v_i$ |
|---|---|---|---|
| 1 | 4 | 1 | 0.700 |
| 2 | 0 |  | 0.826 |
| 3 | 2 | 1 | 0.330 |
| 4 | 1 | 1 | 0.248 |
| 5 | 1 | 1 | 0.248 |
| 6 | 1 | 1 | 0.300 |
| 7 | 0 |  | 0.630 |
| 8 | 4 | 1 | 0.126 |
| 9 | 0 | 1 | 0.252 |
| 10 | 0 | 1 | 0.252 |
FIG. 19
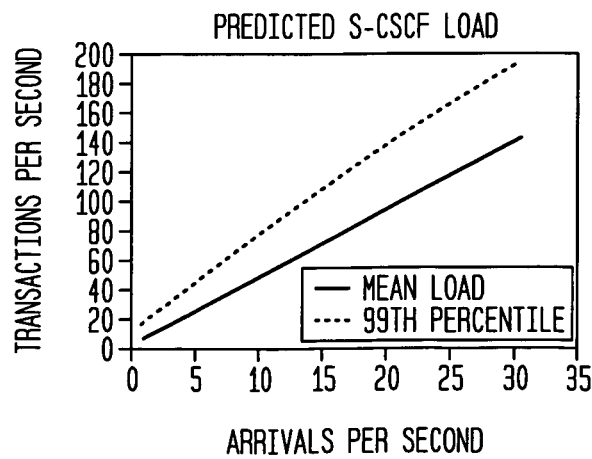

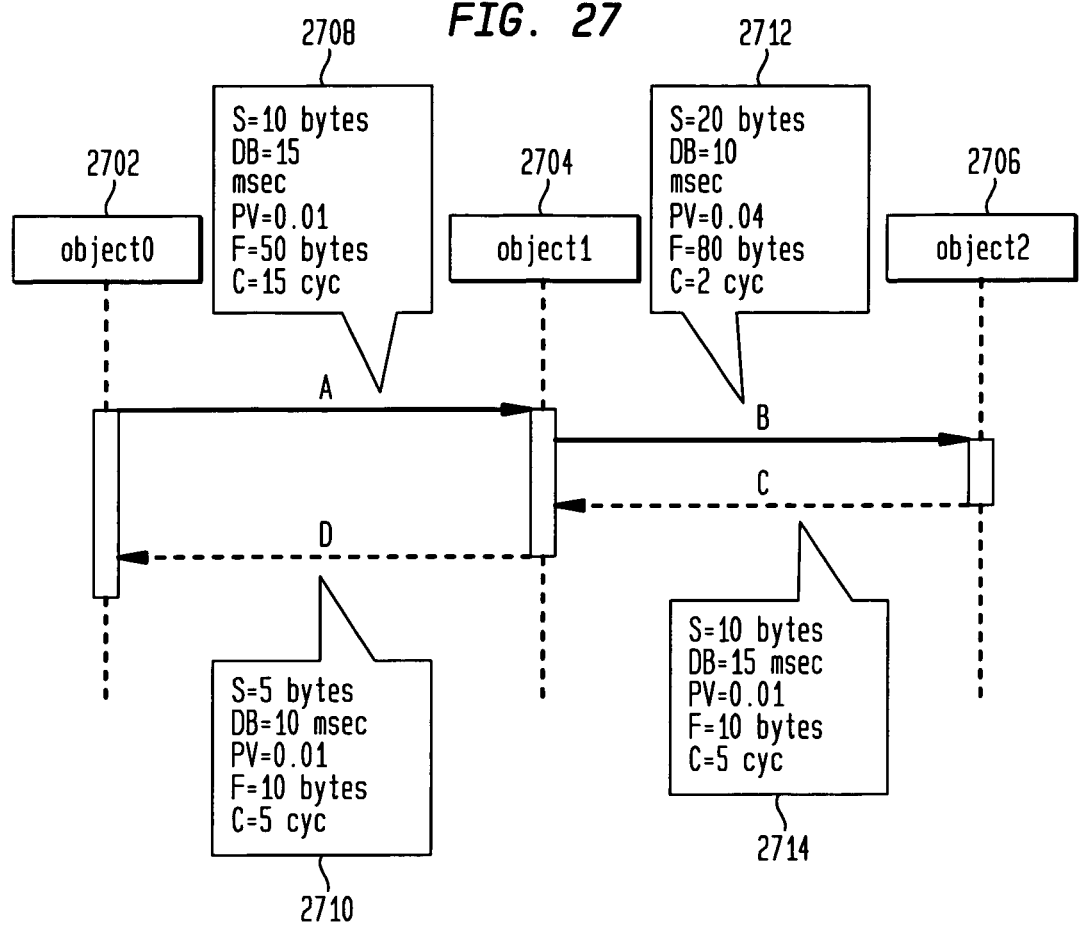

| STP | A | D | Z |
|-----|---|---|---|
| I   | 1 |   |   |
| A   |   | 1 |   |
| D   |   |   | 1 |

| STP | A | B | C | D | Z |
|---|---|---|---|---|---|
| I | 1 | | | | |
| A | | 1 | | | |
| B | | | 0.6 | 0.4 | |
| C | | | | 1 | |
| D | | | | | 1 |

| STP | A | B | C | D | Z |
|---|---|---|---|---|---|
| 1 | 1 | | | | |
| A | | 0.6 | | 0.4 | |
| B | | | 1 | | |
| C | | | | | 1 |
| D | | | | | 1 |

| STP | A | B | C | D | Z |
|---|---|---|---|---|---|
| I | 1 | | | | |
| A | | 0.2 | | 0.8 | |
| B | | | 1 | | |
| C | | | | 1 | |
| D | | | | | 1 |

| STP | A | B | C | D | E | F | Z |
|-----|---|---|---|---|---|---|---|
| I | 1 | | | | | | |
| A | | 0.2 | | 0.3 | 0.5 | | |
| B | | | 1 | | | | |
| C | | | | | | 1 | |
| D | | | | | | 1 | |
| E | | | | | | 1 | |
| F | | | | | | | 1 |

| STP | A | B | C | D | E | F | Z |
|---|---|---|---|---|---|---|---|
| I | 1 | | | | | | |
| A | | 0.06 | 0.54 | 0.4 | | | |
| B | | | | | | 1 | |
| C | | | | | | 1 | |
| D | | | | | 1 | | |
| E | | | | | | 1 | |
| F | | | | | | | 1 |

| STP | A | B | C | D | E | Z |
|-----|---|---|---|---|---|---|
| I | 0.6 | | | | 0.4 | |
| A | | 0.2 | 0.8 | | | |
| B | | | | 1 | | |
| C | | | | 1 | | |
| D | | | | | 1 | |
| E | | | | | | 1 |

| STP | B | C | D | E | Z |
|---|---|---|---|---|---|
| I | 0.12 | 0.48 |  | 0.4 |  |
| B |  |  | 1 |  |  |
| C |  |  | 1 |  |  |
| D |  |  |  | 1 |  |
| E |  |  |  |  | 1 |

| STP | A | B | C | D | E | Z |
|---|---|---|---|---|---|---|
| I | 0.18 | 0.42 | 0.4 | | | |
| A | | 1 | | | | |
| B | | | | | 1 | |
| C | | | | 1 | | |
| D | | | | | 1 | |
| E | | | | | | 1 |

| STP | A | B1 | C1 | B2 | C2 | B3 | C3 | Z |
|-----|---|----|----|----|----|----|----|---|
| I   | 1 |    |    |    |    |    |    |   |
| A   |   | 1  |    |    |    |    |    |   |
| B1  |   |    | 1  |    |    |    |    |   |
| C1  |   |    |    | 1  |    |    |    |   |
| B2  |   |    |    |    | 1  |    |    |   |
| C2  |   |    |    |    |    | 1  |    |   |
| B3  |   |    |    |    |    |    | 1  |   |
| C3  |   |    |    |    |    |    |    | 1 |

FIG. 53
| STP | A | B+D | C | E+G | F | H | Z |
|-----|---|-----|---|-----|---|---|---|
| I   | 1 |     |   |     |   |   |   |
| A   |   | 1   |   |     |   |   |   |
| B+D |   |     | 1 |     |   |   |   |
| C   |   |     |   | 1   |   |   |   |
| E+G |   |     |   |     | 1 |   |   |
| F   |   |     |   |     |   | 1 |   |
| H   |   |     |   |     |   |   | 1 |
FIG. 54
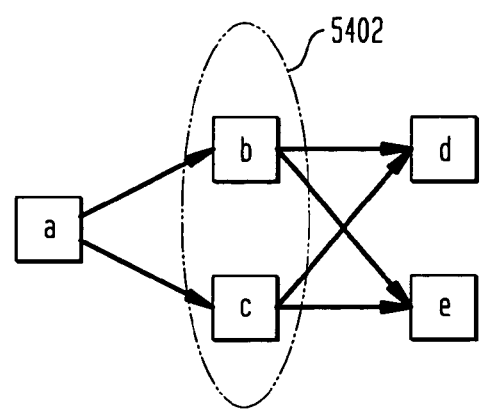
FIG. 55
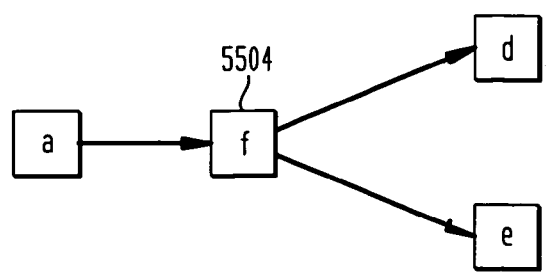

METHOD FOR SYSTEMATIC MODELING AND EVALUATION OF APPLICATION FLOWS

CROSS-REFERENCE TO RELATED APPLICATION

This application is based on and claims priority to U.S. Provisional Application No. 60/753,179, filed on Dec. 22, 2005, entitled "METHOD AND SYSTEM FOR DETERMINING SERVICE IMPACT FROM STATISTICAL MODELS DERIVED FROM ANNOTATED SEQUENCE DIAGRAMS," by Benjamin W. Falchuk, Komandur R. Krishnan, Shoshana Loeb, and David Shallcross and to which a claim of priority is hereby made and the disclosure of which is incorporated by reference.

FIELD OF THE INVENTION

The present invention generally relates to evaluating service impacts, for instance, semi-automatically and directly, from well-formed sequence diagrams depicting the service. Impact analysis enabled by this method may include: resource capacity assessment, storage requirements, processing requirements, billing analysis.

BACKGROUND OF THE INVENTION

Estimating and analyzing the impact or load of services on resources is an important task to consider for ensuring successful operation of the services. In today's competitive and dynamic business environment, organizations need to continually evaluate the effectiveness of operational processes and infrastructures and look for ways to transform the process to achieve better service and utilization. In order to achieve such results there is a need for a capacity assessment modeling tool that can accurately assess the effectiveness of existing service components, evaluate the impact of services and potential changes to the process and identify opportunities for improvement.

Take for example communication networks that are widely used for exchange of messages and transactions. The messages and transactions in these networks often include complex schema built upon the exchange of specific sequences of messages in commercial applications such as web-browsing, audio/video teleconferences, on-line banking, catalogue-shopping, etc. The success of the applications running on the network depends on the ability of the network to provide appropriate guarantees regarding the integrity and performance requirements of transactions. In light of such systems, network planning and service analysis becomes an important issue to consider. And the ability to accurately model the services, for example, IP based communication services, and their impact on network resources such as estimating the load on the service components is desirable.

As another example, the IP Multimedia Subsystem (IMS) enables operators and service providers to control bearers, sessions and charging of multimedia services using Internet protocol. IMS is designed to enable smooth interoperation between wireless and wireline networks, mobile and fixed networks, and circuit-switched and packet-switched technologies in a manner independent of the access technology. Evaluating the load and stress on IMS core network components can become complex, given the wide range of services that can be offered and the number of network components involved. For instance, services can involve complex interactions between IMS-compliant and non-IMS networks (like the PSTN), with different services requiring differing levels of involvement from the IMS components (for example, application that do not inter-work with the legacy PSTN do not make use of the Media Gateway function) and different amounts of processing and bandwidth at each of these components. Therefore, it is desirable to have a method and system that enable the operators, service providers and equipment manufacturers to estimate and evaluate the operational load that various service components can support (or anticipated loads incurred by planned services) for a wide range of services and applications. It is also desirable to understand financial, security, and quality-of-experience impacts that services may have at design time.

BRIEF SUMMARY OF THE INVENTION

A method and a system for modeling and evaluating impact on service components are disclosed. The method in one aspect includes annotating a sequence diagram that describes a plurality of service components and communication flows between the service components and deriving input parameters to a Markov model from the annotated sequence diagram for determining and analyzing impact on one or more of the plurality of service components. The annotating may be performed using one or more ontology tools. The derived input parameters may include states and state transition probabilities representing the communication flow between the service components.

In another aspect, the step of annotating is extensible, allowing the method of the present disclosure to support not only derivation of service impact vis a vis capacity but also any other quantifiable aspect of a system, not limited to capacity analysis. For any instances of the quantifiable aspect (e.g. "cost of operations") that can be attached to the diagram, the method of the present disclosure may be used to perform analysis. For instance, storage impacts, processing impacts, and financial/billing impacts can also be analyzed using the method of the present disclosure using the annotations for these aspects that are well-formed and systematically attached to the diagram.

The system for modeling and evaluating impact on service components in one aspect includes a processor operator to present a sequence diagram describing service components and flow of transactions between the service components. The processor is further operable to enable entering information associated with the sequence diagram and to derive a Markov model from the sequence diagram and entered information.

The system in another aspect may include a user interface for allowing a user to enter annotations to the sequence diagram. Yet in another aspect, the system may further include a data model associated with one or more elements in the sequence diagram. The annotations may be entered according to the data model specification. Still yet, the processor may be operator to reverse engineer the derived Markov model to generate a new sequence diagram.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 17 illustrates the states in the Markov model derived from the sequence diagrams.

FIG. 18 illustrates state parameters computed using the sequence diagrams.

FIG. 19 illustrates predicted load computed from a Markov model.

FIGS. 27-53 illustrate examples of various parts of sequence diagrams and derived Markov parameters.

FIG. 54 illustrates an example of a state diagram.

FIG. 55 illustrates a reduced version of the state diagram shown in FIG. 54.

DETAILED DESCRIPTION

Method and system for modeling and evaluating resource requirements or capacity of services are disclosed. In an exemplary embodiment of the present disclosure, the method and system provide a tool that can be used to estimate and evaluate impact of services on different components of an operation. The tool preferably enables a user to create or derive a mathematical model from a software model representing a service operation. A user may then analyze the mathematical model to determine and evaluate various resource impact and planning requirements of the service operation. In an exemplary embodiment of the present disclosure, an application session is represented as a semi-Markov model having states and state transition probabilities. An application session refers to all or parts of transaction flows of work components in any service or business operations. For example, messages flowing through different components in a communication network can be characterized as an application session. A fleet of delivery trucks transporting goods from source and destination areas may also be an example of an application session. Other examples abound.

Any networked service, for example, services having a network of components through which transactions flow, can be thought of as having a probabilistic "application profile" in terms of its usage of network resources. In a semi-Markov application model, an application has some finite set S of possible states s. Instances of the application start according to a Poisson process with an arrival rate $\alpha$. On start-up, an application chooses an initial state according to some probability distribution. After some duration (possibly random), the application leaves the state, and enters another state, chosen according to transition-probabilities specified in the transition matrix, where the individual elements represent the probability of entering state t on leaving state s. At least one of the states, for example, state x, is a session-termination or "absorbing" state, with the property that process comes to an end and no network resources are used in state x. During its sojourn in each state s, an application performs certain tasks, for example, of communication and computation.

In one embodiment, the system and method of the present disclosure include creating a Markov model from an application session that is described in a sequence diagram as a sequence of events and annotated with information. A sequence diagram, for example, is a software model that represents the flow of work transactions in an operation being monitored or evaluated. The derived Markov model includes the states and their transition probabilities of the application session. By considering resources needed in each state, for example, from the annotated information and by examining the probabilistic evolution of the states, various resource requirements imposed by the service or application may be estimated and evaluated.

Figure 1:
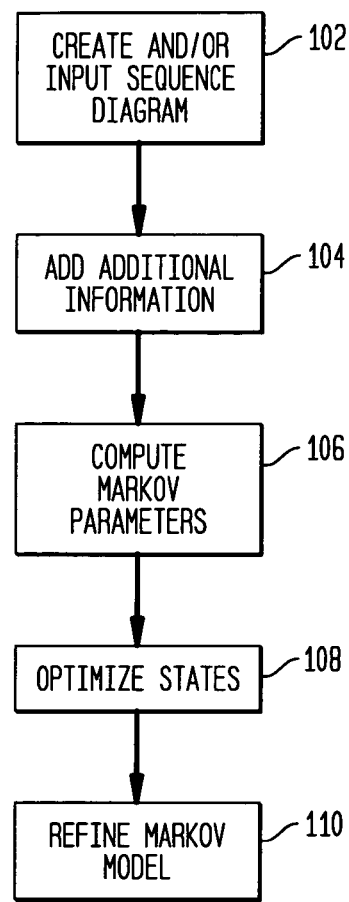
FIG. 1 is a flow diagram illustrating a method for creating a Markov model in one embodiment.
Figure 6:
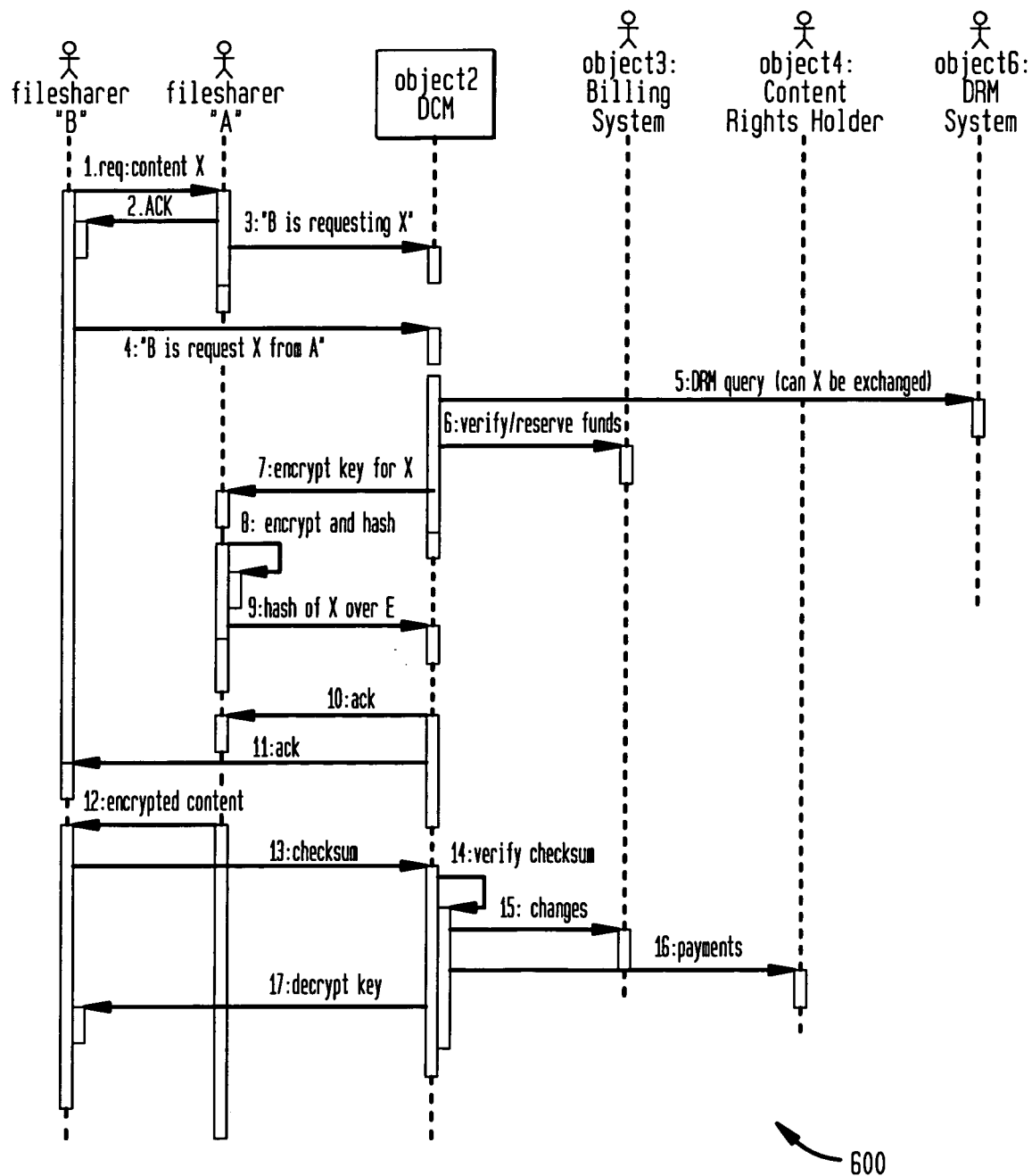
FIG. 6 illustrates a single DCD session, in which two sharers exchange a single piece of data.

FIG. 1 is a flow diagram illustrating a method for creating a Markov model in one embodiment. At 102, an operator or an analyst, for example, creates or imports a sequence diagram that describes an application session being monitored or analyzed and annotates key parts of the diagram using the element from ontology. An example of a sequence diagram is shown in FIG. 6, details of which will be described therein.

Figure 2:
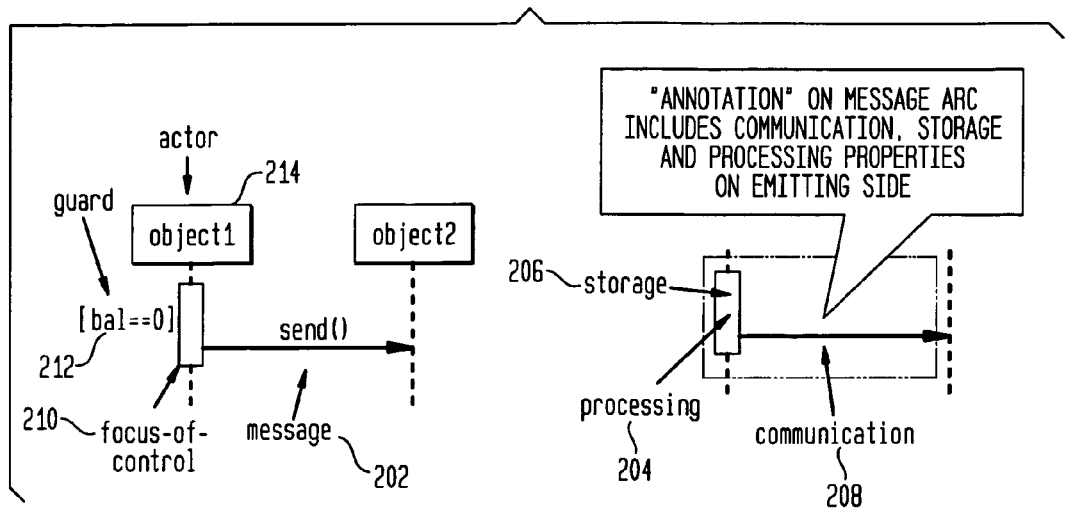
FIG. 2 illustrates an example of an element from a sequence diagram that describes a network communication session.

Software modeling tools such as the Unified Modeling Language 2.0 (UML) may be used to describe the application session in a sequence diagram. In addition, although not limited to such, ontology tools such as the Web Ontology Language (OWL) may be used to annotate the sequence diagram for describing the resources and the artifacts related to the application session. FIG. 2 illustrates an element from a UML 2.0 sequence diagram that describes a network communication session. In one embodiment, a "message" 202 is a key artifact: each message can be considered to have related processing 204, storage 206 and communication 208 quantities.

Figure 3:
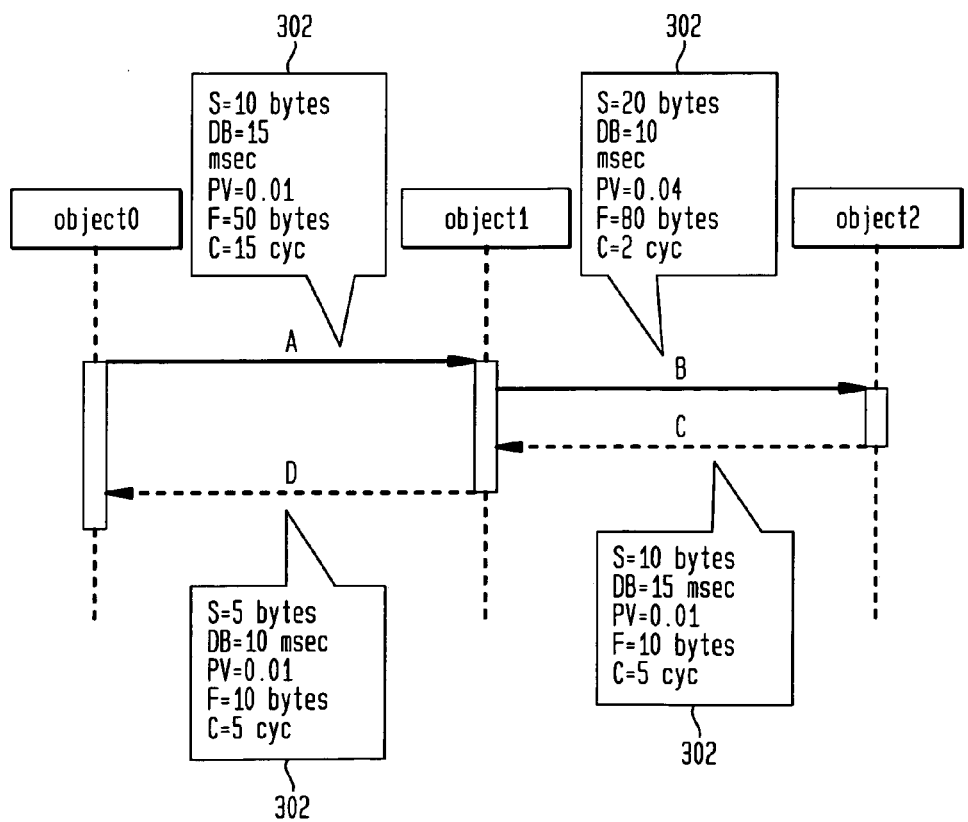
FIG. 3 illustrates the annotation phase in which a simple sequence diagram is given annotations in one embodiment.

FIG. 3 illustrates the annotation phase in which a simple UML 2.0 diagram is given annotations describing communication size, delay bounds, probabilities of violations of bounds, and storage and computation estimations (S, DB, PV, F, C, respectively) 302. In one embodiment, a graphical user interface (GUI) may be implemented to support and allow a user to enter description of these components, for instance, via the ontology. A GUI, for example, may be used to display the diagrams and provide a user with capabilities to enter the information not captured by the diagrams. Additionally or alternatively, the description or annotations may be entered using an Extended Markup Language (XML) file attachment schema. The system and method of the present disclosure may also support various descriptive mathematical concepts through the ontology, enabling, for example, the analyst to describe size and probability distributions (for example, normal, exponential, discrete, etc.).

Referring back to FIG. 1, auxiliary input may be entered to further annotate the sequence diagram at 104. For example, an analyst may enter more information that helps to configure subsequent computation. At 106, the sequence diagram and its annotations are parsed. Missing information may be heuristically provided and an iterative process begins in which the parameters of the semi-Markov model are created and initialized. The parameters, for example, include states and probabilities of transitions. At 108, the system and method of the present disclosure, for instance, guided by user input, may reduce and optimize the number of states in the semi-Markov model. At 110, the analyst may consider the resulting model with the ability to return to any previous step. At the completion of the steps the analyst may run any number of algorithms that compute the effect of the service on the network based on Markov input.

Figure 4:
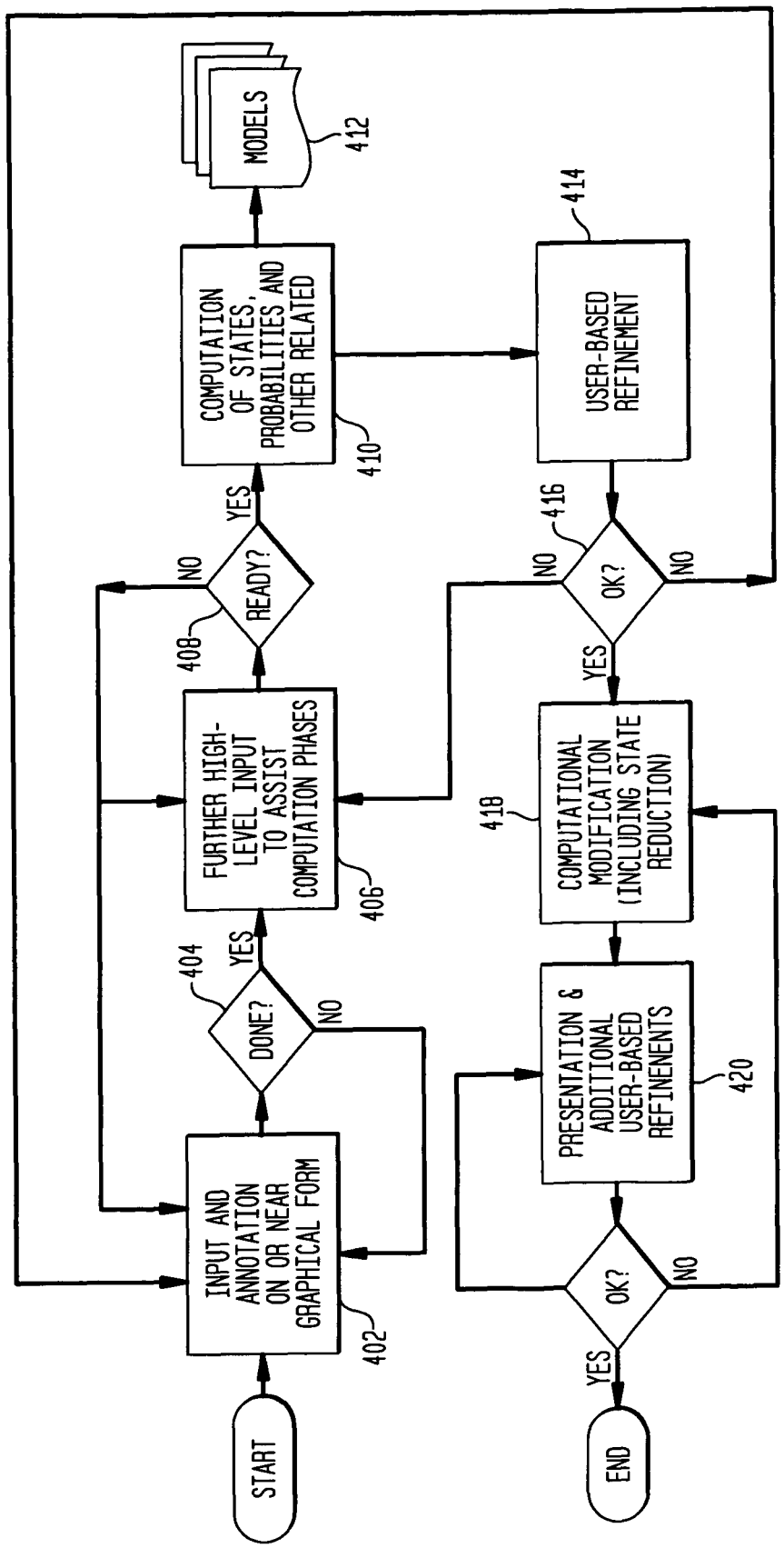
FIG. 4 is a flow diagram illustrating a method for creating parameterized input to a semi-Markov process model from a sequence diagram in one embodiment.

FIG. 4 is a flow diagram illustrating a method for creating parameterized input to a semi-Markov process model from a sequence diagram in one embodiment. A sequence diagram may be created using a software modeling tool such as UML 2.0 SeqD. Briefly, Sequence Diagrams (SeqD) are typically used to document how a system behaves in certain use-cases. The SeqD is a useful stepping stone in system design as it provides a formal and detailed view of system behavior. Each diagram represents a sequential flow of messages between actors in the system. SeqD are usually read by developers who translate their understanding of what is depicted into an object's implementation. SeqD are also read by other technical and business staff during the software development/refinement phase. Existing standards, such as the UML, define some of the artifacts allowed in sequence diagrams—some of these are listed and explained below:

- guards—a guard is an expression whose evaluation determines the flow of messages in a SeqD. If the guard holds true then the subsequent artifacts should be interpreted as being next. If not, the reader skips down (in time) to the first message appearing after the guards controlled area, which may be a fragment, etc.
- alt fragment—describes alternate flows of control, depending on some guards evaluation(s), very much like the if-elseif-elseif-else construct in programming. Alternate sub-fragments within the fragment are separated by a horizontal dashed line.
- optional fragment—describes an optional flow of control, depending on some guard evaluation, very much like the if construct in programming. That is, the artifacts within the fragment are considered active only if the guard holds true.
- loop fragment—describes a set of artifacts that are considered repeated two or more times. The guard or information element associated with the fragment informally describes the constraints on the loop index indicating the number of repetitions of the fragment.
- ref—a stand-in for another SeqD within a given SeqD. The reader understands that the referred to SeqD is 'executed' in place wherever references in the given SeqD.
- break fragment—when this fragment is approached the guard is evaluated; if it evaluates to true the fragments artifacts are executed once and the model is considered 'completed'. If not, the fragment is skipped over.
- parallel fragment—describes two or more parallel sequences of artifacts separated from each other graphically via horizontal dashed lines. Each sub fragment is considered to be executing in parallel with the others and no ordering can be determine between artifacts in different sub fragments.
- ignore and consider filters—an ignore fragment is one inside which a certain set of named messages are ignored or not considered, while a consider fragment is one in which only a certain set of named massages is considered.
- assert and neg fragment—an assert fragment describes sequences of messages that should happen at this point in the diagram, while a neg fragment describes those that should not.
- critical fragment—identifies an important set of messages.

In one embodiment, a sequence diagram or a set of sequence diagrams describing an application session can be created using the above-described and additional artifacts provided by software modeling tools such as the UML 2.0 SeqD. An application session may be any service or network framework that includes functional behavior and interaction among different components of the services. At 402, various parts of the sequence diagram are annotated. A user interface, for example, can prompt a user to input various information. Some user inputs may be associated with specific parts of the sequence diagram while others may be more generally applicable to the application in question. In one embodiment, annotations and input are stored in a well-defined format that allows subsequent manipulation. In one embodiment, the input and annotation phase involves associating additional information to a sequence diagram. The added information (also called adornments) in one embodiment may be based on a pre-defined grammar and has a value (based on a schema or ontology) and is associated with a specific part of the sequence diagram. At 404, the inputting and annotating continues until the user has supplied all relevant information about the service at the appropriate places in the sequence diagram.

Figure 5:
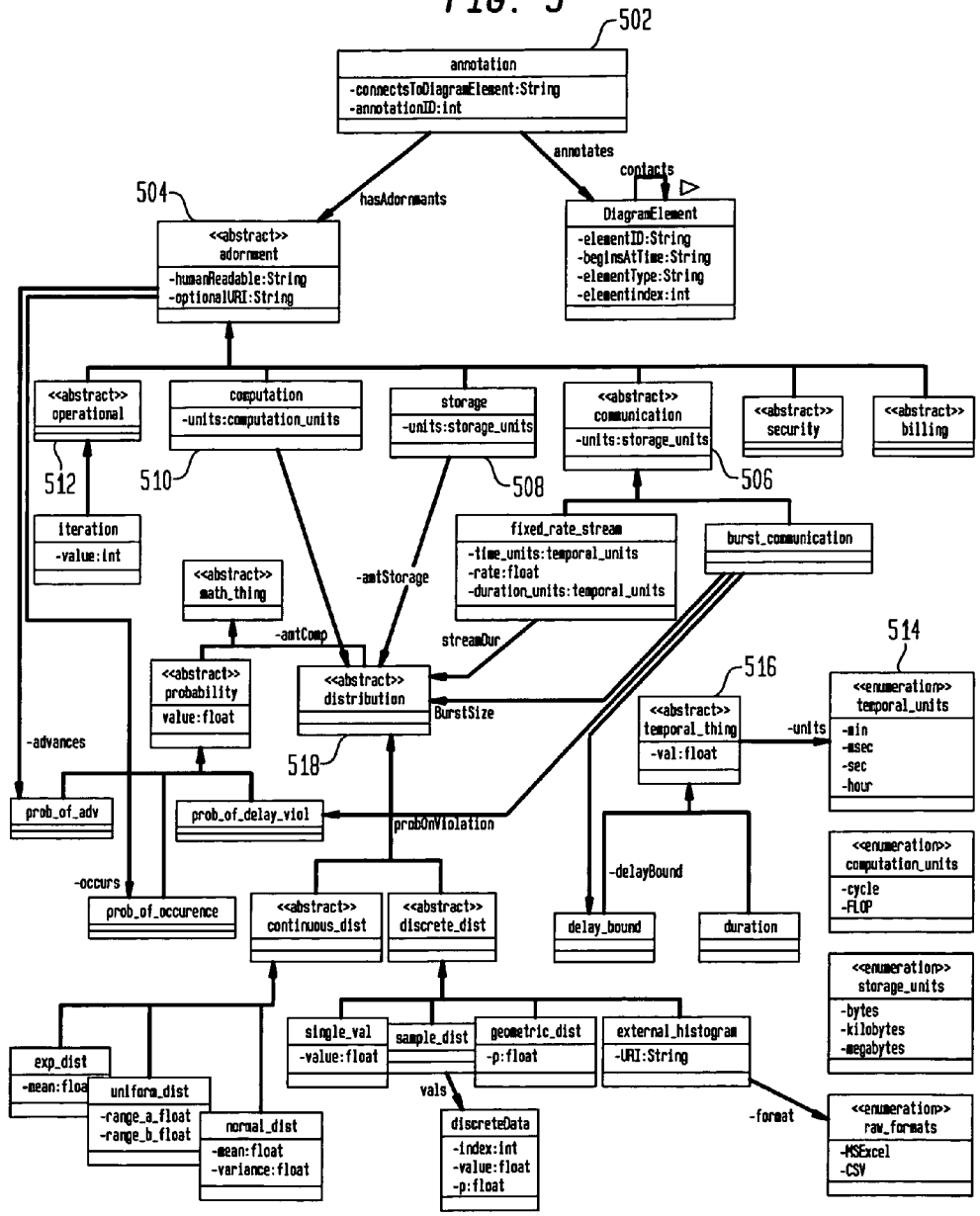
FIG. 5 is an example of a logical data model that forms the basis of annotation in one embodiment.

FIG. 5 is an example of a logical data model that may be used for annotating various parts of a sequence diagram in one embodiment. The example data model shown in FIG. 5 describes components and work flow of a communication network. The logical elements describe allowable annotations and their data types. An annotation 502 describes an element on a sequence diagram. The annotation may include one or more adornments 504 which adorn the sequence diagram elements with information. Adornments express information that will help the system create the semi-Markov model parameters. In this example, there are several types of adornments: communications 506 allows the expression of communication-related information such as the type of stream (burst vs. fixed stream, etc.); storage 508 allows the expression computer-storage related information; computation 510 allows the expression of computation; operational 512 describes iterative session behavior. Other logical elements that provide information may include: unit type descriptions 514 that allow units to be expressed unambiguously; temporal things 516 such as delay bounds and durations that are distinguishable and have units; distributions 518 that describe a taxonomy of mathematical distribution types and a way to supply values, allows users to enter single discrete values as well as other types of discrete and continuous distributions describing annotations (e.g. normal distribution, etc). In one embodiment, the logical model may be mapped to an XML representation or OWL/RDF for manipulating the data automatically.

In one embodiment, instances of the logical model shown in FIG. 5 may be used to annotate a sequence diagram. In one embodiment, a GUI that is used to enable a user to enter annotations or information on sequence diagrams makes use of a logical model template such as the one shown in FIG. 5. Examples of sequence diagram artifacts that may be annotated include messages (FIG. 2, 202), endpoints and/or foci of control (FIG. 2, 210), guards (FIG. 2, 212), fragments, and actors and/or classes (FIG. 2, 214). Messages, for example, may be annotated with communication subclasses as either a burst or a fixed rate stream with regard to how it carries data. A message, for example, has units. A burst communication, for example, has a size, delay bound, and probability of violating that delay bound. A fixed rate stream communication, for example, has a rate, time units (for example, per second), duration (and units).

A message arc may be annotated with details that include the storage and processing information of the emitting side. For instance, a given messaging artifact includes the storage and the processing at the node where the communication payload was formed. The actual communication may also be considered associated with the storage and processing.

In one embodiment, a message has at least two ends, a source and one or more targets. Each endpoint, or, the focus of control that either just precedes or just follows the message, may have associated properties such as storage subclasses and computation subclass. Associated storage properties may declare storage units and a distribution of storage values. A message endpoint or its associated foci of control may be annotated with computation aspects. Such annotation has units and a distribution of computation values. Guard conditions may be adorned with a probability of occurrence. In cases where multiple options are presented such as in alt fragments, the option probability adornment values sum to one and any individual probability is in the range [0,1]. Fragments may group any number of messages together and be annotated with any of communication, storage, computation, probability. In addition, loop fragments can be annotated with iteration indicating the number of iterations in the loop.

The following XML syntaxes illustrate several examples of annotations.

```
<annotation connectsToDiagramElement="01191"> <!-- -->
    <burst_communication units="bytes">
        <humanReadable>describes a burst of 1024
        bytes</humanReadable>
        <burstSize><singleVal>1024</singleVal></burstSize>
        <delayBound units="msec">500</delayBound>
        <probOfViolation>0.1</probOfViolation>
```
```
    </burst_communication>
    <storage units="bytes">
        <humanReadable>describes storage distribution of
        msg</humanReadable>
        <normal_dist mean="10.5" variance="2.2"/>
    </storage>
    <computation units="cycles">
        <humanReadable>a discrete computation
        distribution</humanReadable>
        <simple_dist>
            <!-- note: p vals total to 1.0 -->
            <discreteData index="1" value="100.5" p="0.3"/>
            <discreteData index="2" value="150" p="0.2"/>
            <discreteData index="3" value="109" p="0.5"/>
        </simple_dist>
    </computation>
</annotation>
```

In the above example, an adornment of a message diagram element has an ID of 01191. In this annotation, a burst type communication of size 1024 bytes is associated with the message. The delay bound on the burst is 500 msec and probability of violating this bound is 0.1. This action requires storage whose value is described as a normal distribution with mean 10.5 bytes and variance of 2.2. The computation required is described as a discrete distribution of cycles with the values 100.5, 150, 109 with respective probabilities 0.3, 0.2, and 0.5.

An example describing a fixed rate stream of data at the rate of 1021 bytes/sec, with duration in seconds described by an exponential distribution with mean 89.4 sec. follows:

```
<annotation connectsToDiagramElement="01191"> <!-- -->
    <fixed_rate_stream units="bytes" time_units="sec">
        <rate>1021</rate>
        <streamDuration duration_units="sec">
            <exp_dist mean="89.4"/>
        </streamDuration>
    </fixed_rate_stream>
</annotation>
```

An example describing that the probability of a given UML "guard" evaluating to true is 0.3 follows:

```
<annotation connectsToDiagramElement="9811"> <!-- a guard
element -->
    <prob_of_occurrance>0.3</prob_of_occurrance>
</annotation>
```

An example describing a communication with uniform distribution file size (ranging between 1.5 and 2.5 Megabytes), delay bound of 1 minute for the transfer and probability of violation of 0.2, and storage requirements defined by a geometric distribution of megabytes with p=0.5 follows:

```
<annotation connectsToDiagramElement="31"> <!-- -->
    <burst_communication units="megabytes">
        <burstSize>
            <uniform_dist range_a="1.5" range_b="2.5"/>
        </burstSize>
        <delayBound units="min">1</delayBound>
        <probOfViolation>0.2</probOfViolation>
    </burst_communication>
    <storage units="megabytes">
        <geometric_dist p="0.5"/>
```

-continued

```
</storage>
</annotation>
```

An example describing file size (communication, in bytes) in a uniform distribution ranging between 1024 and 2048, and computation in cycles in a uniform distribution ranging from 100 to 150, and a probabilistic storage distribution specified in an external histogram follows:

```
<annotation connectsToDiagramElement="6513"> <!-- -->
    <burst_communication units="bytes">
        <burstSize>
            <uniform_dist range_a="1024" range_b="2048"/>
        </burstSize>
        <delayBound units="msec">500</delayBound>
        <probOfViolation>0.1</probOfViolation>
    </burst_communication>
    <computation units="cycles">
        <uniform_dist range_a="100" range_b="150"/>
    </computation>
    <storage units="bytes">
        <external_histogram format="CSV"
        URI="http://my.com/hist/hist1.csv"/>
    </storage>
</annotation>
```

In an exemplary embodiment, regardless of the data model underlying the annotations of the sequence diagram, the process of making such annotations may be intuitive and user-friendly. For instance, an annotator will not need to understand XML or RDF or any other format in which the annotation is described. Rather, a graphical user interface (GUI) may be provided and lead the annotator through the process providing visual cues that assist the user to, for example, choose the correct annotation type and to fill in the required properties of that information. In one embodiment, the GUI may also check for completeness.

Referring back to FIG. 4, at 406, additional input may be entered by a user. Such optional information may include application arrival rate, termination state creation or an application end point. Termination state can be created, for example, automatically during the Markov computation phase or a user can explicitly add it into the diagram. It may appear as a self-message at the bottom of the diagram. Other information may include probability assignment preference. Probability assignment can be automatic or manual. On a per-element or per-diagram basis, a user may choose to allow the system to automatically assign probabilities to unassigned fragments or the user may assign the probability. Any fragment that can imply conditionality (e.g. alt, break fragments) either by nature or due to the presence of guards, may be a candidate for probability assignment. The system and method of the present disclosure, for example, can automatically assign probability by determining n, the number of possible paths through the fragment (for example, the number of options in an opt fragment) and using 1/n as the probability for each path through the fragment. In manual assignment each path is manually assigned a probability.

Additional information such as parallelism policy and iteration handling policy may be entered at 406. For instance, parallelism policy may include choosing one of several approaches for dealing with ordering of states within a par fragment. A user may select to expand the fragment by considering each message on its own and order them in the sequence they appear in the diagram. This produces the maximum number of messages (and, in turn, states). The par construct (not the messages) can now be removed. A user may also choose to expand (as above) but then contract; aggregate messages within each of the sub-fragments whenever two or more messages have the same source and target. The par construct (not the messages) can now be removed.

For iteration handling policy, a user may for example choose to handle the loop in one of the following ways, but not limited to these only. For instance, a user may choose to expand the loop such that its contents are literally repeated on the diagram n times, where n is the number of iterations. This produces n times the number of messages than in the original loop fragment, and, initially at least, n times the number of states in the computing phase. For example, a loop fragment of two messages with a guard "count=4" produces 8 messages/states. The loop construct (not the messages) can now be removed. A user may also choose to contract the loop such that it has the original number of messages but each message is aggregated n times with itself where n is the number of iterations. The loop construct (not the messages) can now be removed.

At 408, entering of auxiliary information may continue until done. Step 410 includes a computation phase in which the entered information is used to derive semi-Markov parameters. FIGS. 27 to 53 illustrate sample sequence diagrams and examples of computing semi-Markov parameters such as states and probabilities from the sequence diagrams.

In one embodiment of the present disclosure, several processing functionalities are provided and utilized to compute and derive semi-Markov parameters. Examples of the functionalities may include finding first message on next focus of control (NextFOC), finding last message in fragment (LastFr), finding last message in subfragment (LastSubFr), finding first message after fragment (FirstAfterFrag), aggregation (Agg), but not limited to those.

Figure 22:
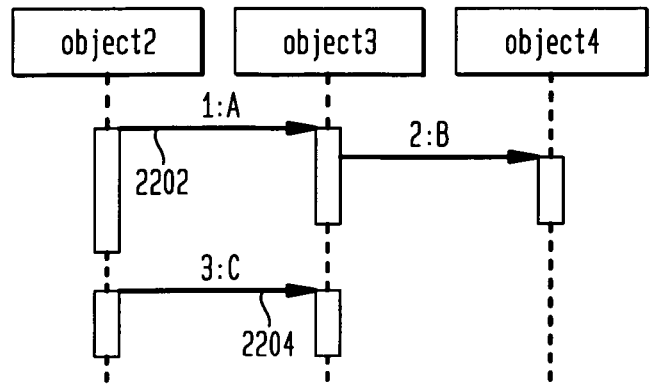
FIG. 22 is a sequence diagram used for illustrating finding first message on next focus functionality in one embodiment.

FIG. 22 is a sequence diagram used for illustrating finding first message on next focus functionality in one embodiment. The utility, Find first message on next focus of control (NextFOC), may be used when deconstructing dependencies and foci of control. It is used to determine the next message not dependent on the current focus of control. In FIG. 22, running this on message A 2202 (or its FOC) returns message C 2204. An example syntax may be NextFOC(A)=C.

Figure 23:
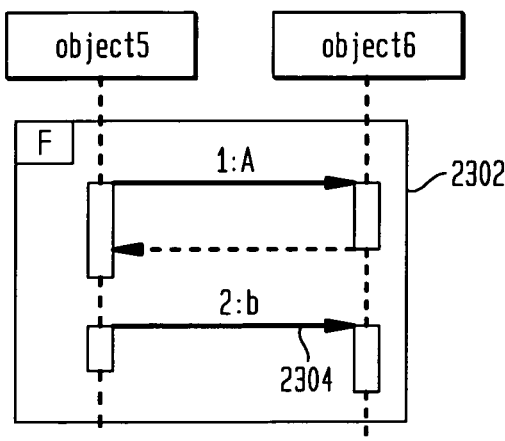
FIG. 23 is a sequence diagram used for illustrating finding last message in fragment functionality in one embodiment.

FIG. 23 is a sequence diagram used for illustrating finding last message in fragment functionality in one embodiment. In one embodiment, find last message in fragment (LastFr) routine determines the final (based on temporal ordering) message in a given fragment. It may be used in building state transitions. In FIG. 23, running this routine on fragment F 2302 yields the message B 2304. An example syntax may be LastFr(F)=B.

Figure 24:
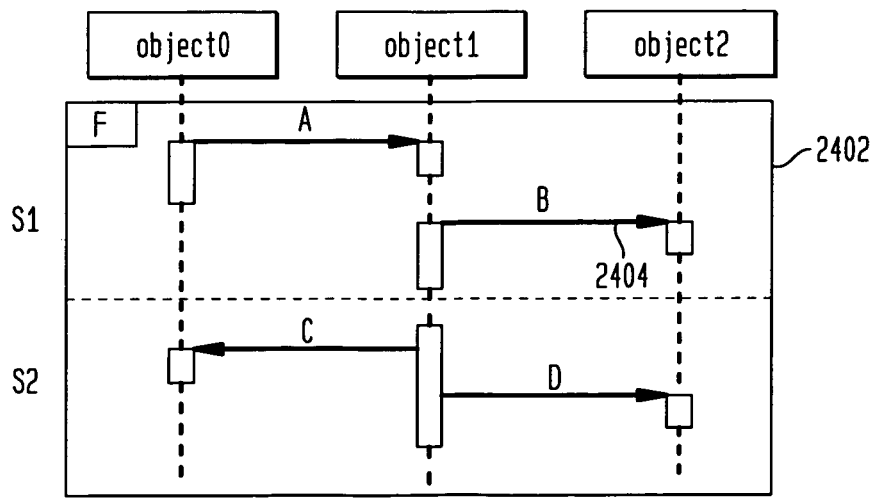
FIG. 24 is a sequence diagram used for illustrating finding last message in subfragment functionality in one embodiment.

FIG. 24 is a sequence diagram used for illustrating finding last message in subfragment functionality in one embodiment. Find last message in subfragment (LastSubFr) routine determines the last valid message in a given subfragment in one embodiment. In one embodiment, a subfragment refers to one of the horizontal partitions of an opt, par, or other partitionable sequence diagram fragments. Running this routine on subfragment S1 2402 in FIG. 24 yields message B 2404. An example syntax may be LastSubFr(S1)=B, while, LastSubFr(S2)=D.

Figure 25:
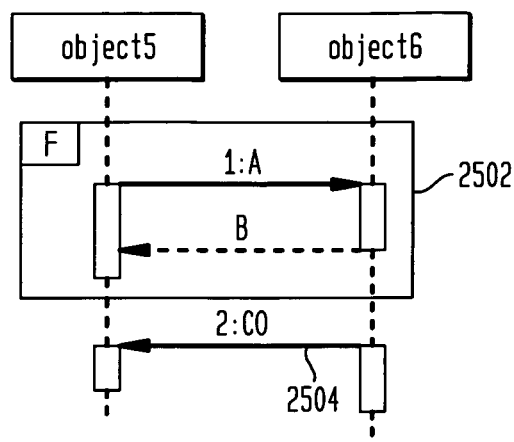
FIG. 25 is a sequence diagram used for illustrating finding first message after fragment functionality in one embodiment.

FIG. 25 is a sequence diagram used for illustrating finding first message after fragment functionality in one embodiment. Find first message after fragment routine in one embodiment determines the first message following any given fragment. Typically that message is not embedded within another fragment although that is possible. Running this routine on fragment F 2502 yields message C 2504 in FIG. 25. An example syntax may be FirstAfterFrag(F)=C.

Figure 26:
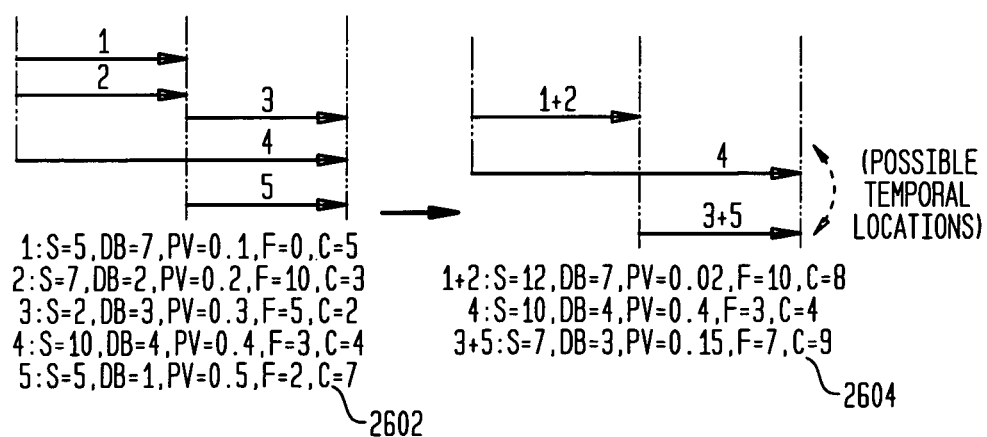
FIG. 26 is a sequence diagram used for illustrating aggregation functionality in one embodiment.

FIG. 26 is a sequence diagram used for illustrating aggregation functionality in one embodiment. Messages may be aggregated. An aggregation in general refers to the process of combining several messages into a single group of messages in order to simplify and reduce the number of associated parameters. For example, two messages from object A to B with messages sizes S1, S2, delay bounds DB1, DB2, probability of violations of delay PV1, PV2 illustrated at 2602 may be aggregated into a single message with size S1+S2, delay bound DB1+DB2 and probability of violation PV1*PV2 as shown at 2604. Aggregating messages A and B (both with same source and destination) yields a single message AB whose parameters are the aggregate of the individual ones in A and B. An example syntax may be Aggregation (Agg).

FIG. 27 illustrates an example of a sequence diagram having messages without guards or fragments. Four messages (A, B, C, D) are exchanged between three nodes. FIG. 28 illustrates corresponding Markov parameters derived from the sequence diagram. In the state chart of FIG. 28, special states I (initial) and Z (final) are shown explicitly. In the rest of the state charts shown in this disclosure may omit I and Z states. However, those states may be implicitly included in calculations. The derived nodes include object0 2702, object1 2704, and object2 2706. In FIG. 28, a blank table entry implies the value "0" and STP (state transition probability) rows sum to 1. In one embodiment, a given state assumes communication between only one pair of nodes (the pair associated with the SeqD message from which the state was derived). Each message may be annotated with multiple parameters and all necessary parameters are supplied as shown at 2708, 2710, 2712, and 2714.

Figures 29, 30:
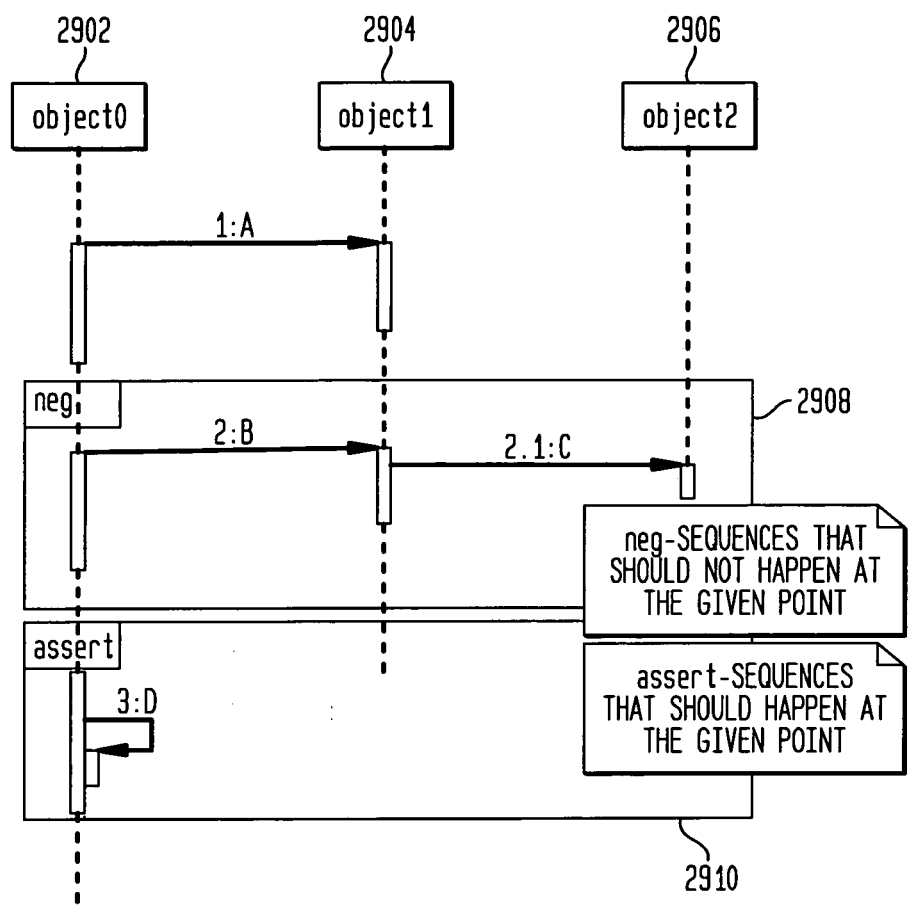

FIG. 29 illustrates an example of a sequence diagram having messages and assert/neg/critical fragments. The derived nodes include object0 2902, object1 2904, and object2 2906. FIG. 30 illustrates corresponding Markov parameters derived from the sequence diagram. Assert, Neg, and Critical fragments are notational callouts in SeqD that indicate that the indicated message sequences either should happen, should never happen, or are critical, respectively. When dealing with these messages the following processing may take place. For neg fragments 2908, the fragment bounding box and all contained messages may be removed before proceeding. For assert and critical fragments 2910, the fragment bounding box can be removed and not considered further, leaving all contained messages. That is, the fragment bounding box is not informative.

Figures 31, 32:
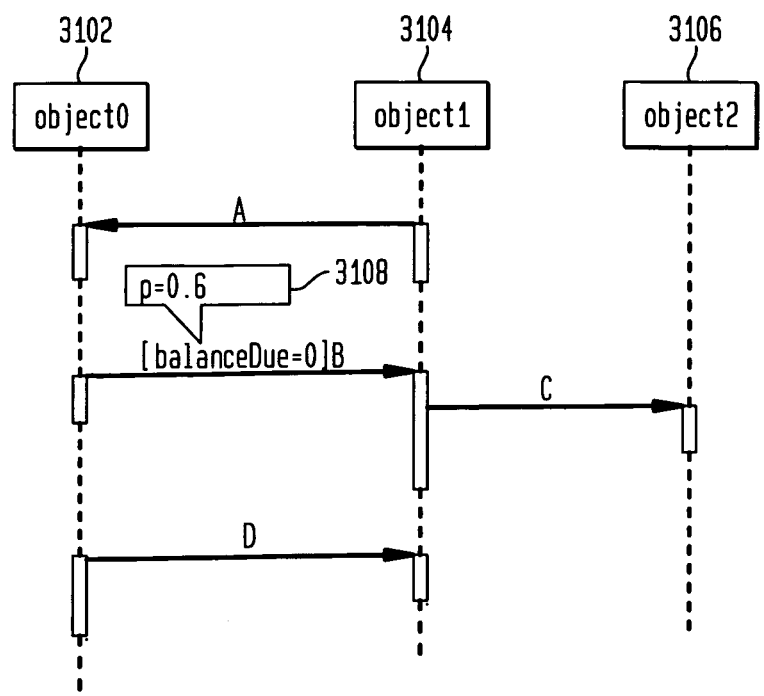

FIG. 31 illustrates an example of a sequence diagram having messages with guards. The derived nodes include object0 3102, object1 3104, and object2 3106. FIG. 32 illustrates corresponding Markov parameters derived from the sequence diagram. When computing states what is guarded by the guard and where the first message after the guard appears are identified. The first message after the guard typically is the fallout case if the guard conditions are not met. Utility function NextFoc(guard:balanceDue=0) may be used to determine the first message after the guard. In this example, the function would return D. The guard is annotated with its probability of firing 3108. A state is derived from the guarded message (B). However the transition from B to the next state (C) is dependent on the annotated probability (p=0.6) 3108. NextFOC(B)=D, so the transition from B to D will be 1−p=0.4 as shown in FIG. 32.

Figures 33, 34:
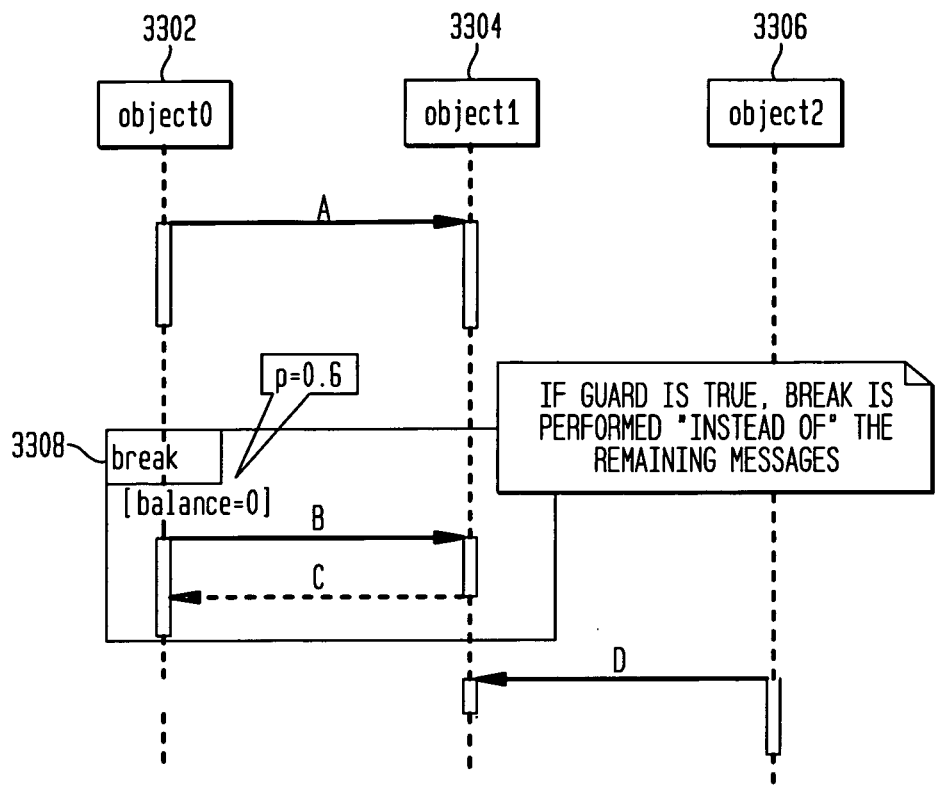

FIG. 33 illustrates an example of a sequence diagram having messages with guards. The derived nodes include object0 3302, object1 3304, and object2 3306. FIG. 34 illustrates corresponding Markov parameters derived from the sequence diagram. The break fragment 3308 adds an alternative path within the SeqD followed by a transition to the end state (i.e. termination). Utility functions LastFr(break)=C, FirstAfterFrag(break)=D may be utilized to identify last message in the fragment and first message after the fragment, respectively. In FIG. 33, the transition from A to B is dependent on the annotated probability (p=0.6). FirstAfterFrag(break)=D, so the transition from A to D will be 1−p=0.4. Additionally, the semantics of the break fragment dictate that the SeqD terminates after message C. Therefore C's next state is the termination state.

Figures 35, 36:
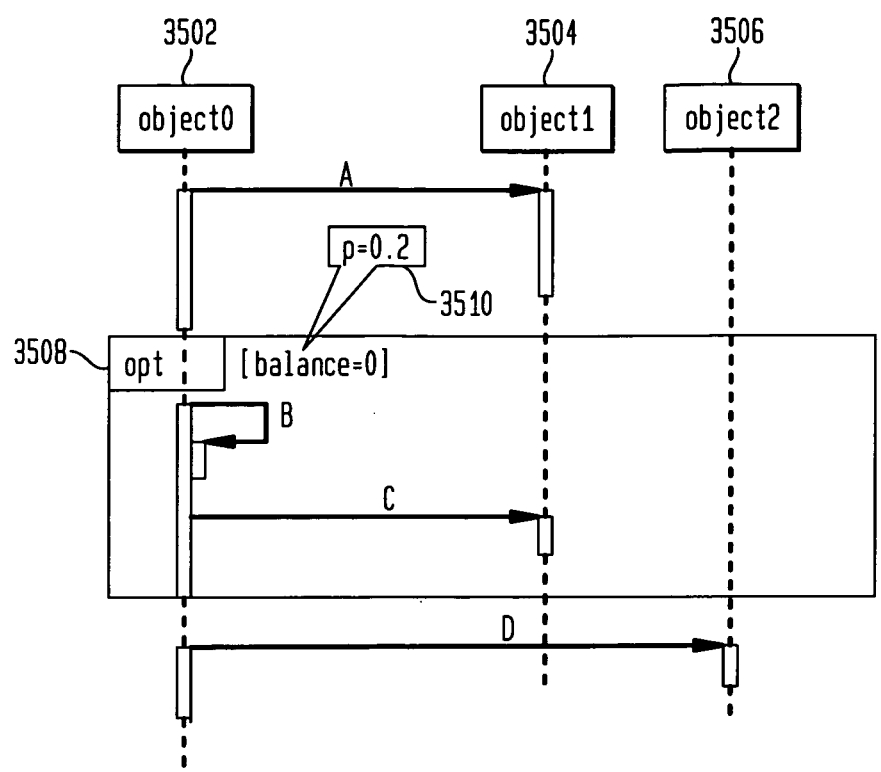

FIG. 35 illustrates an example of a sequence diagram having messages and opt fragment. The derived nodes include object0 3502, object1 3504, and object2 3506. FIG. 36 illustrates corresponding Markov parameters derived from the sequence diagram. Opt 3508 represent probabilistic (optional) message flows within the SeqD. In FIG. 35, the transition from A to B is dependent on the annotated probability (p=0.2) 3510. Running the utility function, FirstAfterFrag (break)=D, the transition from A to D is 1−p=0.8 as shown in FIG. 36.

Figures 37, 38:
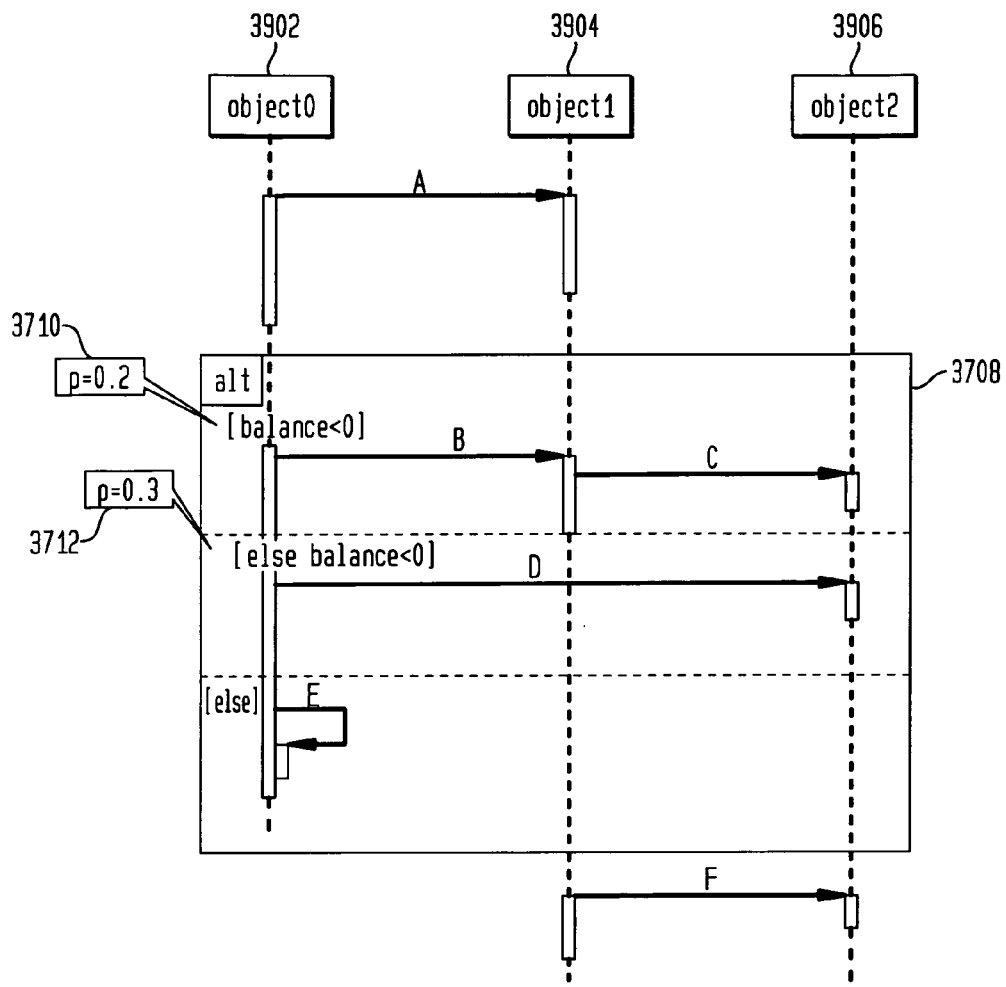

FIG. 37 illustrates an example of a sequence diagram having messages and alt fragment. The derived nodes include object0 3702, object1 3704, and object2 3706. FIG. 38 illustrates corresponding Markov parameters derived from the sequence diagram. Alt fragments 3708 introduce depict two or more alternative paths through the SeqD. They utilize multiple invocations of the utility function LastSubFr( ) to determine the final message in each of the optional subfragments within the main alt fragment. In one embodiment, the transition from each of these is always to the first message following the fragment, found by FirstAfterFrag( ). For the SeqD shown in FIG. 37, following utility functions are used: FirstAfterFrag(alt)=F, LastSubFr(balance>0)=C, LastSubFr (balance<0)=D, LastSubFr (else)=E. The transition from A to B is dependent on the annotated probability (p=0.2) shown at 3710, from A to D (p=0.3) shown at 3712 and from A to E the probability can be derived to be p=0.5 shown in FIG. 38. For each subfragment the transition from the last message in it to the FirstAfterFrag(alt)=F is always 1.

Figures 39, 40:
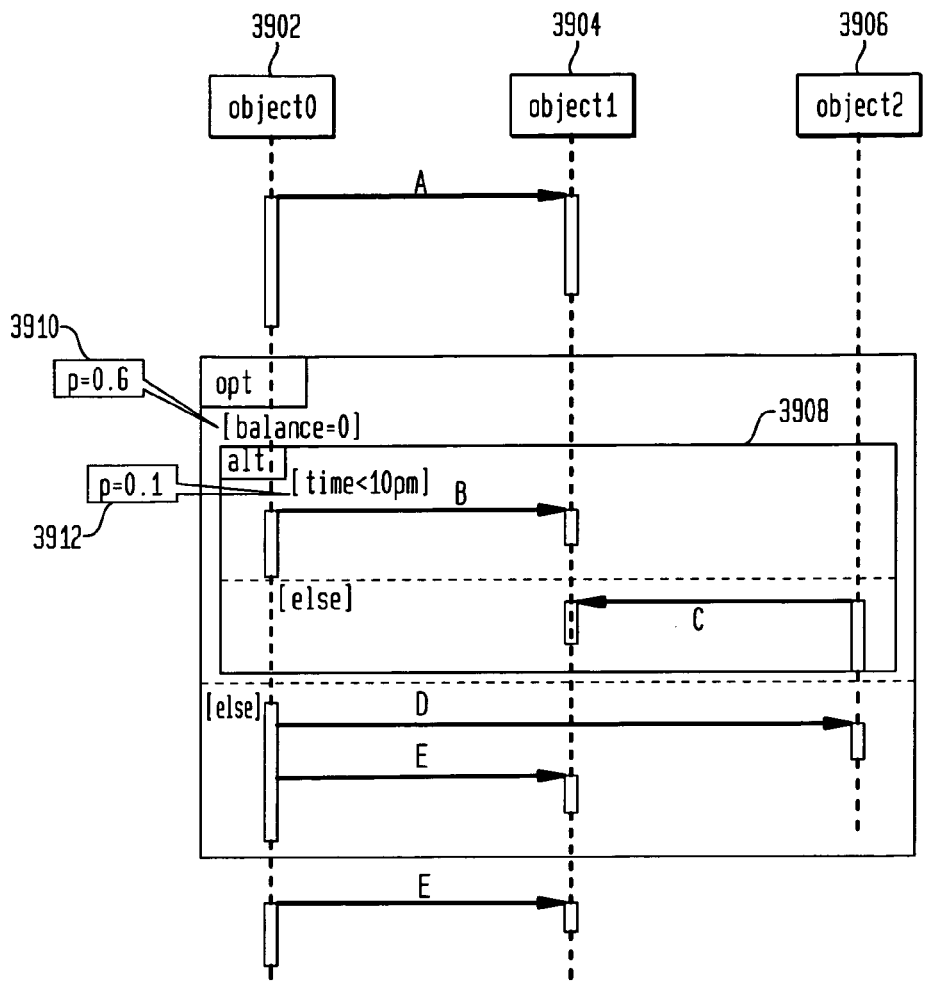

FIG. 39 illustrates an example of a sequence diagram having compound alt fragments. The derived nodes include object0 3902, object1 3904, and object2 3906. FIG. 40 illustrates corresponding Markov parameters derived from the sequence diagram. When Alt fragments are nested as shown in 3908 they represent options within options. Therefore, the probabilities are multiplied when considering an option within the embedded alt. The following utility functions are utilized: FirstAfterFrag(alt)=F, LastSubFr(time<10 pm)=B, LastSubFr(else time>=10 pm)=C, LastSubFr(else balance<=0)=E. In FIG. 39, the transition from A to B is dependent on a composed probability (p=0.6 AND p=0.1) 3910, 3912, from A to D (p=0.4) (1−0.6). Therefore, transitioning from A to B has p=0.6*0.1=0.06 and from A to C has p=0.54. In one embodiment, for each subfragment the transition from the last message in it to the FirstAfterFrag(alt)=F is always 1.

Figures 41, 42:
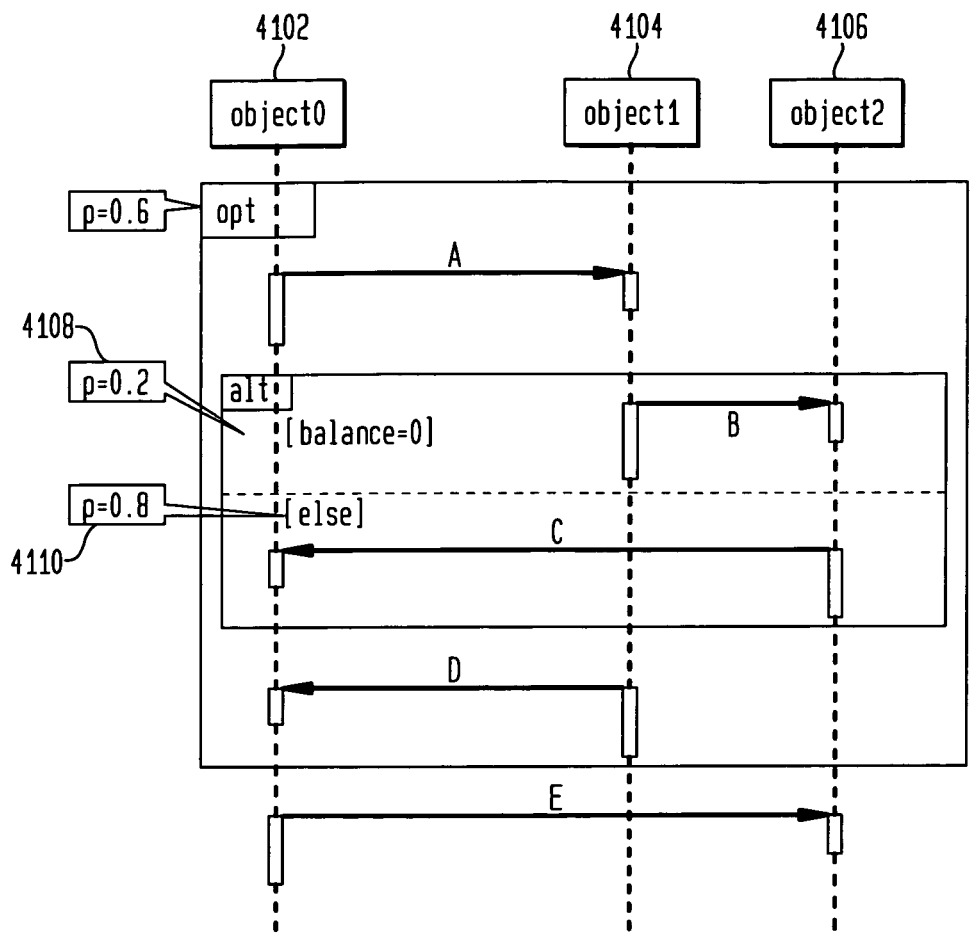

FIG. 41 illustrates an example of a sequence diagram having alt embedded within opt fragment with one or more leading embedded messages. The derived nodes include object0 4102, object1 4104, and object2 4106. FIG. 42 illustrates corresponding Markov parameters derived from the sequence diagram. For the sequence diagram of FIG. 41, the following utility functions may be used: FirstAfterFrag(opt)=E, LastSubFr(balance=0)=B, LastSubFr(else)=C, LastFr(opt)=D. In FIG. 42, the transition from A to B has p=0.2 as shown at 4108 and from A to C has p=0.8 shown at 4110. Transition from I to E has probability of 0.4 (that is, 1−0.6).

Figures 43, 44:
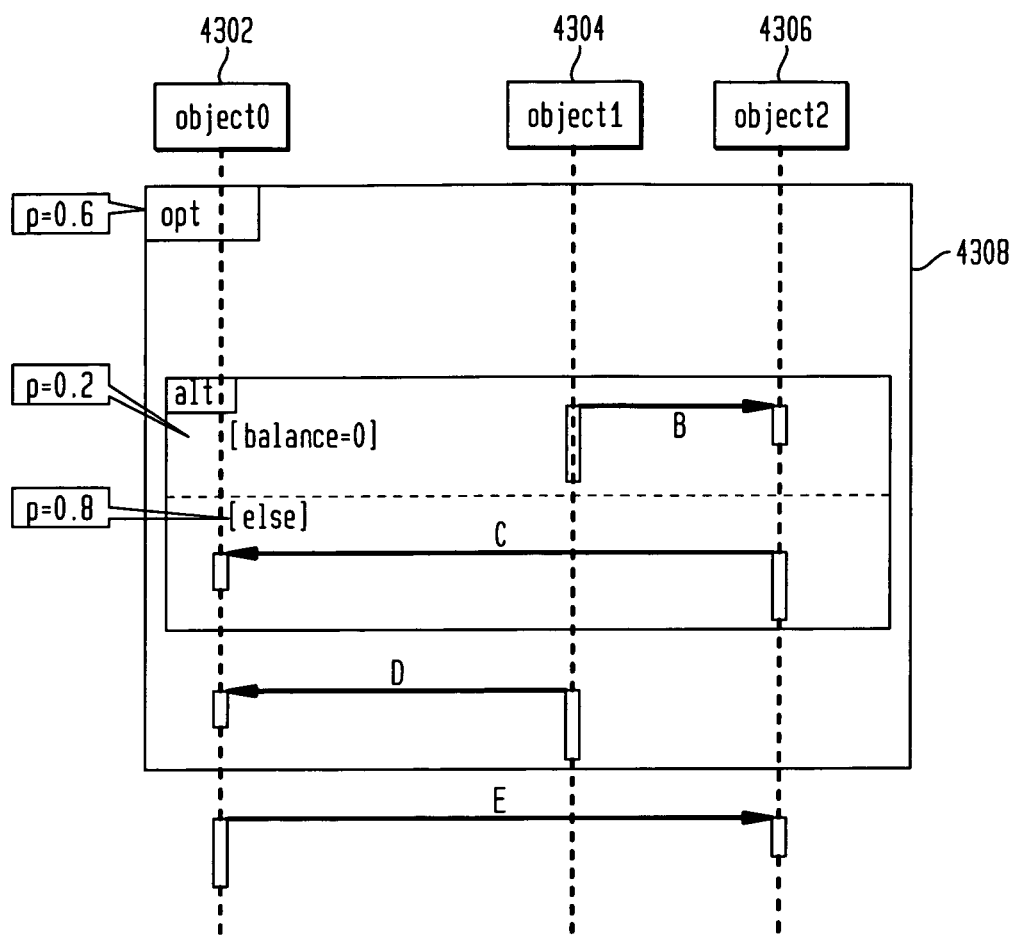

FIG. 43 illustrates an example of a sequence diagram having alt embedded within opt fragment with no leading embedded messages. The derived nodes include object0 4302, object1 4304, and object2 4306. FIG. 44 illustrates corresponding Markov parameters derived from the sequence diagram. In the example shown in FIG. 43, the SeqD is the same as the previous except that the leading message A within the opt 4308 fragment is no longer present. Utility functions used may include: FirstAfterFrag(opt)=E, LastSubFr(balance=0)=B, LastSubFr(else)=C, LastFr(opt)=D. The transition from the initial state to the first message is dependent on a composed probability; this is true because the first element (temporally) is B which is subject to two fragments, not just one. Therefore, transitioning from I to B has p=0.6*0.2=0.12 and from I to C has p=0.6 (0.8). It is also possible that the opt fragment is not hit at all, leading to the transition from I to E with p=0.4.

Figures 45, 46:
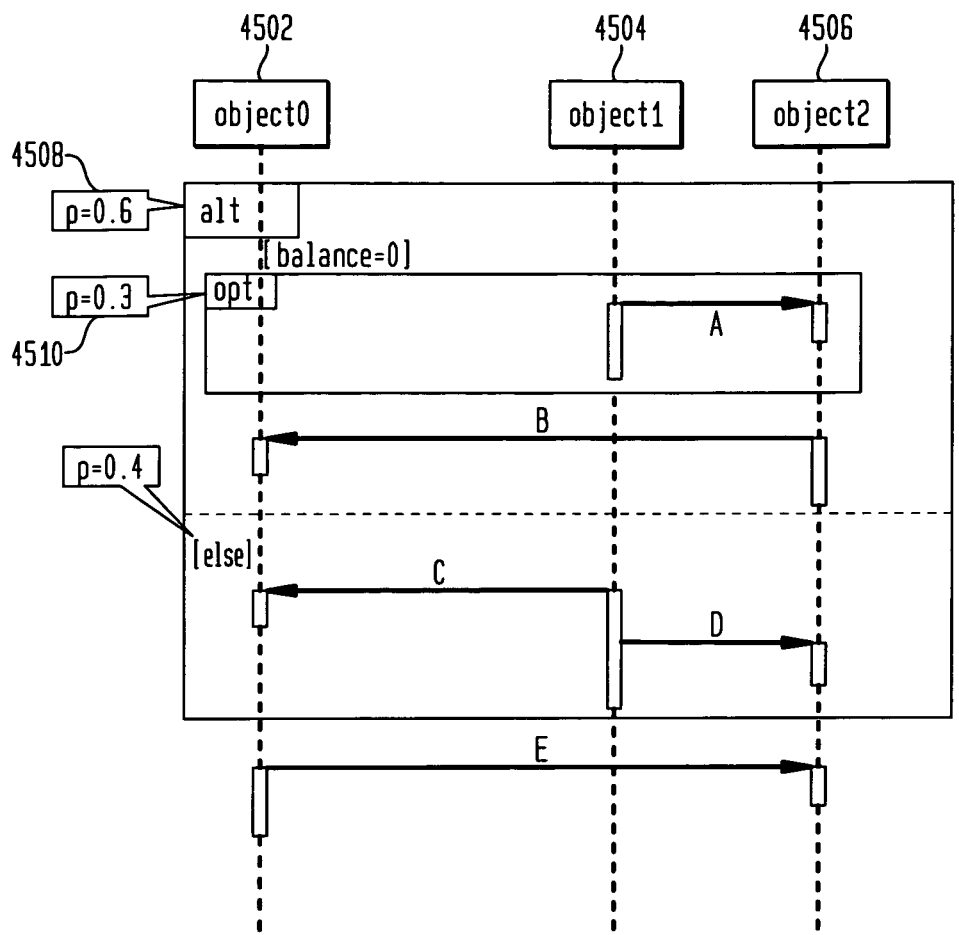

FIG. 45 illustrates an example of a sequence diagram having compound opt within alt fragment. The derived nodes include object0 4502, object1 4504, and object2 4506. FIG. 46 illustrates corresponding Markov parameters derived from the sequence diagram. If an opt fragment appears within an alt, the rules are similar to the above reasoning: multiplicative probabilities may apply if there are no leading messages, for example, if the first message temporally is subject to both the alt and the opt fragments. For the SeqD shown in FIG. 45, the following utility functions may be used: FirstAfterFrag(alt)=E, LastSubFr(balance=0)=B, LastSubFr(else)=D, LastFr(opt)=A. As in other embedded cases the first message after initial state is any one of three possible states (messages). For example, arriving at message A is subject to p=0.6 of the [balance=0] guard shown at 4508, as well as the probability of the optional fragment opt whose p=0.3 shown at 4510. This makes for a probability of 0.18 of arriving at A from I.

Figure 47:
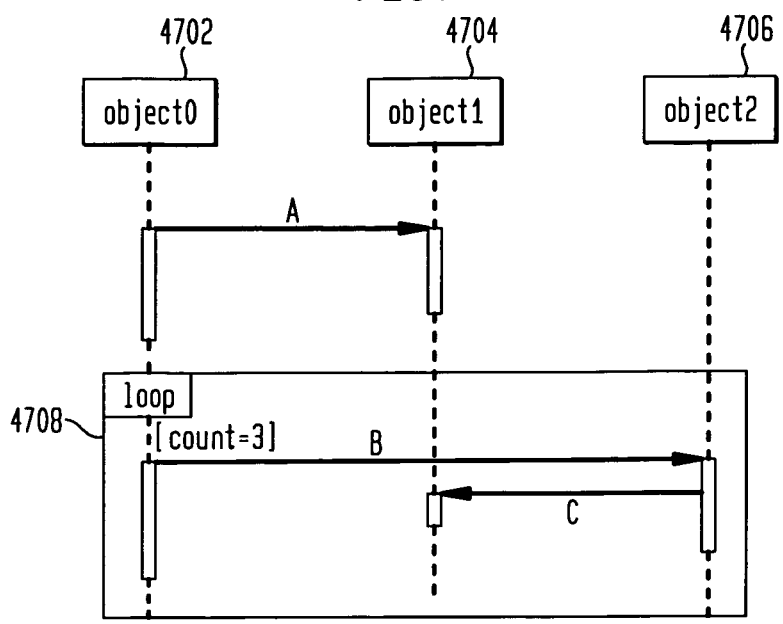
Figure 48:
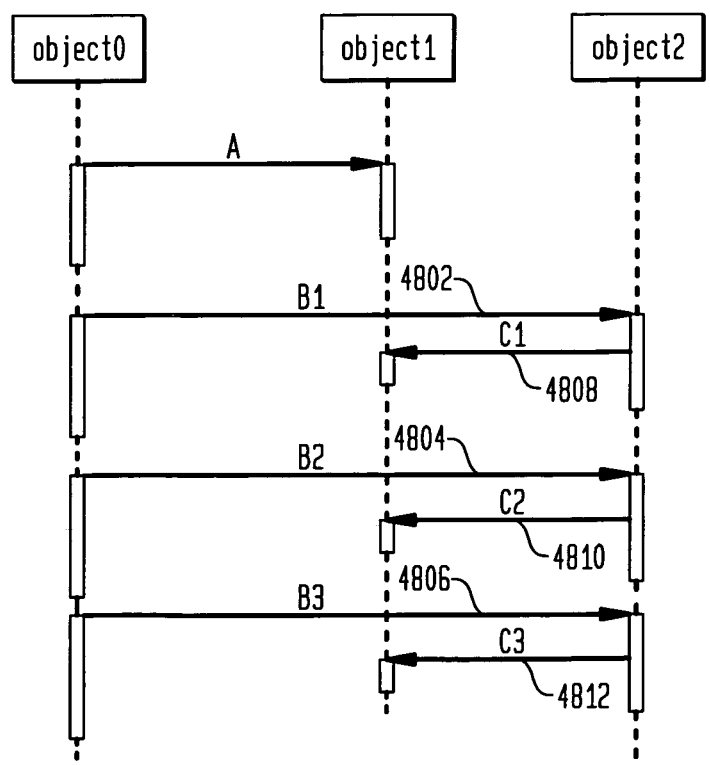
Figures 49, 50:
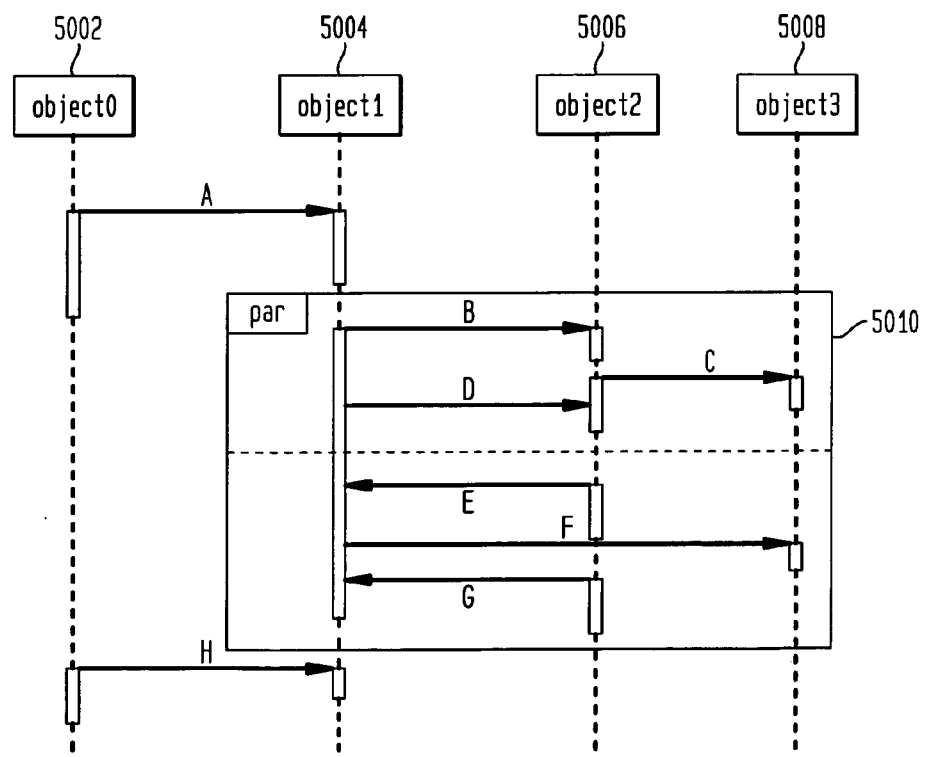

FIG. 47 illustrates an example of a sequence diagram having loop fragment expansion. The derived nodes include object0 4702, object1 4704, and object2 4706. FIG. 49 illustrates corresponding Markov parameters derived from the sequence diagram. As described previously, one option for dealing with loop fragments is to expand the fragment through n times (where n is the number of loop iterations). Since n is not always specified on the SeqD it may have to be explicitly annotated. In one embodiment, a user may be allowed to specify a probability distribution describing n. The SeqD in FIG. 47 shows a loop fragment in a diagram with n specified as 3 at 4708. The SeqD in FIG. 48 illustrates the same diagram with the loop fragment expanded: the B message within the fragment explodes to B1, B2, and B3 (4802, 4804, 4806 respectively). The C message is similarly expanded (4808, 4810, 4812). The ordering may be preserved and repeated.

Figure 51:
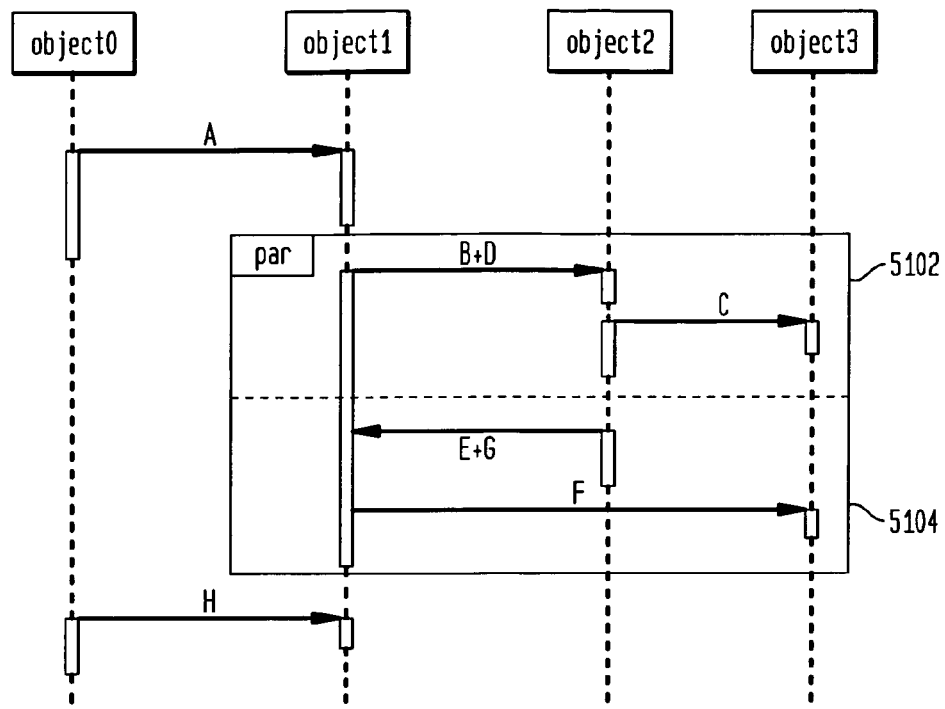
Figure 52:
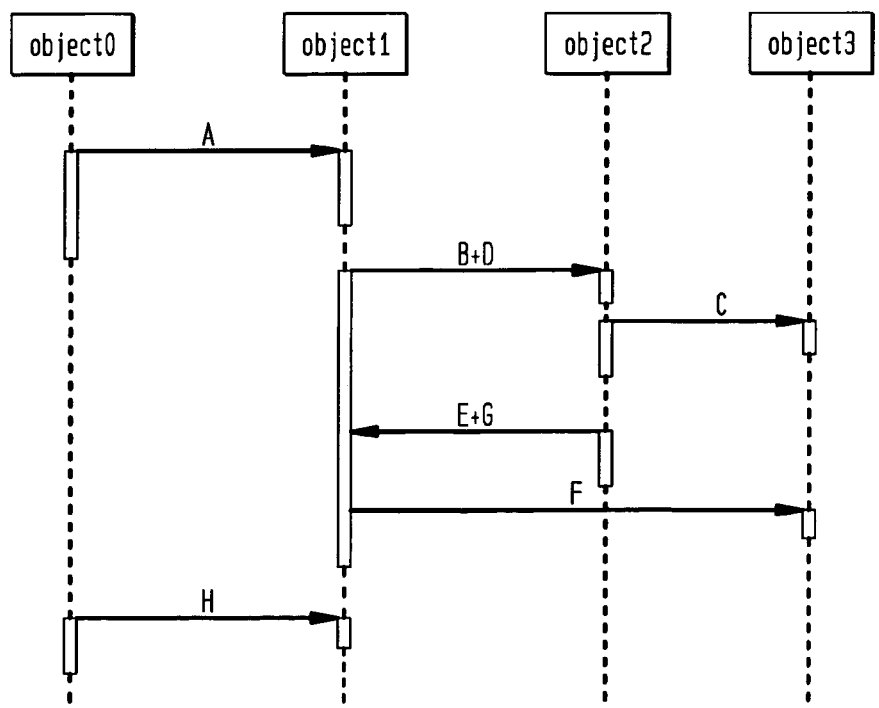

FIG. 50 illustrates an example of a sequence diagram having parallel fragments and messages. The derived nodes include object0 5002, object1 5004, and object2 5006, object3, 5008. The par fragment 5010 describes sets of messages that may (or may not) occur in parallel (temporally). In one embodiment, such fragments may be handled by preprocessing, for example, by removing the par construct completely and accepting messages in the order they were presented. Another way to handle the fragments is to examine every par subfragment for messages with the same source and target objects and aggregating those that have the same. The par construct is then removed. The aggregation method for dealing with par fragments is shown in FIG. 51. In the SeqD shown in FIG. 50, a par fragment has 2 parallel 'tracks'. Aggregating messages within subfragments results in seqD shown in FIG. 51. In the SeqD in FIG. 51, messages B and D have been aggregated within the first subfragment 5102, and messages E and G in the second 5104. Removing the par construct results in the SeqD shown in FIG. 52. FIG. 53 illustrates corresponding Markov parameters derived from the sequence diagram.

Referring back to FIG. 4, the computing phase at 410 yields the models 412. Any of the computation methods described above may be used to derive the models 412. At 414, a user is presented with the intermediate results of the Markov model creation and given an option to refine the results further. For example, a user may be made aware of the following issues that are verified in the computation phase:

UML fragments or combinations of elements that cannot be understood by the computation phase—such elements need to be either redrawn or discarded.

Completeness of the annotations—are all elements adequately annotated? If not, the user may make the annotations or possibly remove the elements from the sequence diagram. For example, all communications annotations except fixed rate streams may require specification of delay bound for the transfer as well as a probability of violating the delay bound.

Value constraints—many of the probability distributions may require non-zero data values (for example, means, variances, etc).

Probability summations verification—if the computation phase was unable to reconcile the Pij matrix such that each row sums to zero, it is likely that the user has entered values as annotations that either conflict or make such summation to one impossible. These may need to be redone.

In one embodiment, if there were errors in any of the above or other parameters, or if the user desires to add more information or modify the entered information, the user has an option to re-annotate the sequence diagram and/or provide additional information for recomputing the Markov model. Thus, at 416, a user may choose to return to the input and annotation phase at 402 and/or the further high-level input phase at 406. On the other hand, if no changes are needed, the user may continue on with the current specification at 418.

At 418, it may be desirable to reduce and possibly minimize the number of Markov states computed at 410. For instance, state minimization often yields reduced complexity and cost of realization and diagnosis becomes simpler without redundant states. For service designers and analysts it is useful to have an executable model of the service that has been reduced because analysts may be interested in seeing exactly which states (and corresponding communications) were reduced out of the model, for example, deemed redundant. From this point, further analysis may help them to make service designs and sequence diagrams less cluttered and redundant. Also, simplicity becomes important in model communication in and amongst organizational teams. For example, it may be desirable to have a simple and elegant output than an overly redundant one.

Any minimization techniques may be used to reduce the number of states. Generally, minimization techniques for deterministic finite automata (DFA) and non-deterministic finite automaton (NFA) are known and will not be described in detail here. A non-deterministic finite automaton (NFA) is one in which a given state transition does not necessarily lead to a single unique new state; instead it may lead to any one of several others, in a probabilistic manner. NFA's, more than DFA's, can more closely model the states in an application in which the application's behavior depends on user choices which are made probabilistically (for example, users choose option A with probability 0.3 and option B with probability 0.7). Therefore, the resulting semi-Markov state-space and transition matrix from the application described in the sequence diagram may take one of two forms: DFA when the application's description in a sequence diagram encodes no probability; NFA when the application's description in a sequence diagram encodes one or more probabilistic transition. Given a DFA, a known approach to minimization involves finding equivalent states by continually partitioning the states into sets that are all k-equivalent, where k is the 'step' in the algorithm. States are equivalent when they have the same outputs under all possible inputs. This implementations has complexity as small as O(nlogn) with respect to the number of states.

An approach to reducing NFA's is similar to DFA approaches; however, the additional complexity is that states are partitioned only when their summed probability distributions between partitions is different (in DFA's there is only one possible next state). The result is that there is a partition where all states in a block of the partition are doing the same thing, and have the same probability distribution for the block in which the next state lies. Partitions containing equivalent states can be grouped into a single new state (thereby reducing the state-space). Heuristics for reducing and merging are presented in the following paragraphs.

Different techniques that may be applied to reduce the number of states may include, but is not limited to state partitioning and state merging. In both techniques, one needs to decide when two states are "doing the same thing". This may vary depending on the purpose of the analysis. For example, for bandwidth calculations, two states may be treated as doing the same thing if the bandwidth requirements are the same, and the durations of the states are the same (have the same distribution). If it is desired to reduce model that specifies messages by text descriptions, such as "file query", "acknowledgement", etc, two states are doing the same thing if the same messages are sent between the same sources and destinations. If there are costs or profits associated with visiting certain states, then two states are doing the same thing if they have the same cost or profit. States doing the same thing are not necessarily fully equivalent, as equivalence also may require the same probability distribution of next states. Two models are equivalent if they give identical probabilities for any sequence of doing things. It is also possible to consider models which are only approximately equivalent, where the probabilities may be only approximately the same or the things being done are only approximately the same.

The state partitioning technique follows the procedure for state minimization for finite state automata, successively refining a partition of the set of all states. At the end there results a partition where all states in a block of the partition are doing the same thing, and have the same probability distribution for the block in which the next state lies. Initially a model of the system has a set S of states, a transition matrix P, and communication or computation specified in each state. A partition of S is formed where each block of the partition includes all states that are doing the same thing. The following steps are repeated until no further refinement is possible.

1. For each state $s_i$, and each block $B_j$ in the current partition, compute the probability $$\hat{p}_{ij} = \sum_{k \in B_j} p_{ik}$$

that the next state will be in $B_j$.

2. If for any blocks $B_i$ and $B_j$, the values $\hat{p}_{kj}$ are not constant over all states $s_k$ in $B_i$, $B_i$ is split into blocks of constant value of $\hat{p}_{kj}$ thus refining the partition.

When no further refinement is possible, each block of the final partition consists of states for which the probability of any particular sequence of "doing things" is the same. Furthermore, for states in different blocks there may be some sequence of "doing things" for which the two states have different probabilities. A reduced model is defined where the blocks of the final partition serve as states, with the transition probability $p_{ij}$ being the computed $\hat{p}_{kj}$ common to all states $s_k$ in block $B_i$.

The following describes the state merging technique. With the state splitting procedure, two states that do the same thing and have the same probability distribution for the next state are never split. This includes the special case in which there is only one possible (with probability>0) next state for the two states. In lieu of running the full state splitting procedure, a user can, as a heuristic, just look for pairs of such states and merge them. This will not in general be as powerful as the full state splitting procedure. The state splitting procedure, while providing minimal models for finite state automata, may not always do so for Markov chains. Consider a model with five states, a, b, c, d, and e as shown in FIG. 54. Suppose a, b, d, and e have different communications requirements, but b and c have the same communications requirement. Suppose state a can be followed by either state b or state c, with probabilities $p_{ab}$ and $p_{ac}$ respectively. Suppose further that each of state b and state c can be followed by state d or state e, and that $p_{bd} \neq p_{cd}$. With the state splitting procedure, a user may start with blocks {a}, {b,c}, {d}, {e}, but splits b from c because they have different probabilities of leading to the block {d}.

A user can, however, replace states b and c 5402 with a single state f 5504 as shown in FIG. 55, with the same communications requirements as b or c, and with $p_{af}=1$, $p_{fd}=p_{ab}p_{bd}+p_{ac}p_{cd}$ and $p_{fe}=p_{ab}p_{be}+p_{a}p_{ce}$. This may be imagined as, while in state f, remembering that the user came from state a to either b or c, but not which, until a user makes the decision to choose between states d and e.

This can be formulated as a rule: if a set S of states that do the same thing share a single common possible predecessor state a, user can replace S by a single state b that does this same thing, so that $$p_{ab} = \sum_{c \in S} p_{ac},$$

and $$p_{bc} = \sum_{d \in S} p_{ad} p_{dc},$$

$\forall c$.

More generally, if a set S of states that do the same thing share a set T of common possible predecessor states, where $|T|<|S|$, S can be replaced by a set T' of states, one for each state in T, (so for a in T create a' in T') where $$p_{aa'} = \sum_{b \in S} p_{ab} \quad \forall a \in T$$

$$p_{ab'} = 0 \quad \forall a, b \in T, a \neq b$$

$$p_{a'b} = \sum_{c \in S} p_{ac} p_{cb} \quad \forall a \in T, \forall c$$

The states in T' do the same thing that the states in S did. Symmetrically, if a set S of states that do the same thing share a set T of common possible successor states, where $|T|<|S|$, S can be replaced by a set T' of states, as before, where $$p_{ab'} = \sum_{c \in S} p_{ac} p_{cb} \quad \forall b \in T, \forall a$$

$$p_{a'a} = 1 \quad \forall a \in T$$

$$p_{a'b} = 0 \quad \forall a, b \in T, a \neq b.$$

Referring back to FIG. 4, at 420, the semi-Markov model has been created and the user is given a chance to approve, disapprove and edit one or more parameters, or simply take advantage of the visualizations provided at this phase. In this phase, either or both of the following may be presented: a) the semi-Markov model in a user friendly way, b) a sequence diagram that is reverse engineered from the reduced semi-Markov model. The sequence diagram reverse engineered and presented may be simplified compared to its original form. Such a simplified representation may provide the analyst and/or service designer key sights into the nature of the application by, for example, detecting (and removing) redundant messages. This phase concludes when the user is satisfied with the results and wishes to run more complex algorithms upon the semi-Markov model. Optionally, this phase may be skipped.

Figure 7:
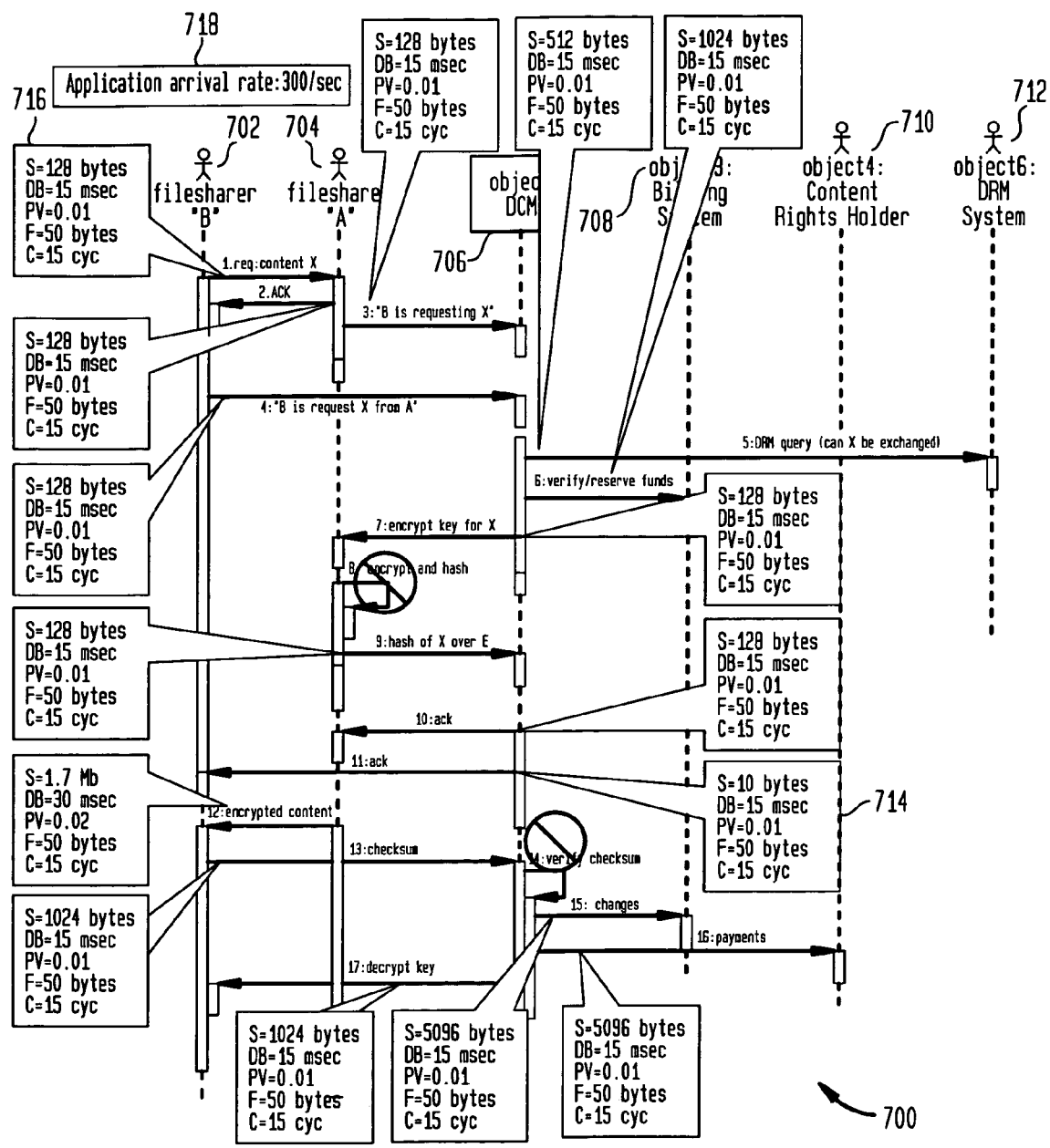
FIG. 7 shows an annotated diagram in one embodiment.

In the following description, a DCD (digital content distribution) system is used as a sample application session to create a semi-Markov model using the above-described method. Briefly, DCD system is a content mediator for digital content distribution, for example, P2P file-sharing. DCD plays a middle-man role, managing encryption and decryption keys, authentications, digital rights, and so on. DCD comes into play when two file-sharers have agreed to exchange DCD-seeded content. FIG. 6 illustrates a single DCD session as a sequence diagram 600, in which two sharers exchange a single piece of data. This example develops a deterministic semi-Markov model using the method described above. The annotation values (for example, file sizes, delay bounds) used in this description are illustrative only. FIG. 7 shows an annotated diagram 700 in one embodiment. For instance, the messages are annotated with the following description S=communication size (plus units); DB=delay bounds for communication (plus units); PV=probability of violation of delay bounds; F=storage requirements (plus units); C=computing cycles (plus units). Further, in this example, nodes A 704, B 702, Digital Content Mediator (DCM) 706, Billing 708, Content Rights Holder (CRH) 710, DRM 712 are derived. An example of an annotation on message 11 is shown at 714.

In a computation phase, the system and method of the present disclosure in one embodiment extrapolates a state for each message source. In this example, un-annotated and UML self-messages are not computed, since these do not imply communication and can be combined with previous messages and states. A state is made for each message 1-17, except for messages 8 and 14. Therefore states 1-7 correspond to the same named messages, states 8-12 to messages 9-13, and states 13-15 to messages 15-17. Z is a terminating state. Given these 15 states the Pij matrix is computed as shown in Table 1 (empty rows indicate 0).

TABLE 1

| STP | 1 | 2 | 3 | 4 | 5 | 6 | 7 | 8 | 9 | 10 | 11 | 12 | 13 | 14 | 15 | Z |
|---|---|---|---|---|---|---|---|---|---|---|---|---|---|---|---|---|
| 1 |  | 1 |  |  |  |  |  |  |  |  |  |  |  |  |  |  |
| 2 |  |  | 1 |  |  |  |  |  |  |  |  |  |  |  |  |  |
| 3 |  |  |  | 1 |  |  |  |  |  |  |  |  |  |  |  |  |
| 4 |  |  |  |  | 1 |  |  |  |  |  |  |  |  |  |  |  |
| 5 |  |  |  |  |  | 1 |  |  |  |  |  |  |  |  |  |  |
| 6 |  |  |  |  |  |  | 1 |  |  |  |  |  |  |  |  |  |
| 7 |  |  |  |  |  |  |  | 1 |  |  |  |  |  |  |  |  |
| 8 |  |  |  |  |  |  |  |  | 1 |  |  |  |  |  |  |  |
| 9 |  |  |  |  |  |  |  |  |  | 1 |  |  |  |  |  |  |
| 10 |  |  |  |  |  |  |  |  |  |  | 1 |  |  |  |  |  |
| 11 |  |  |  |  |  |  |  |  |  |  |  | 1 |  |  |  |  |
| 12 |  |  |  |  |  |  |  |  |  |  |  |  | 1 |  |  |  |
| 13 |  |  |  |  |  |  |  |  |  |  |  |  |  | 1 |  |  |
| 14 |  |  |  |  |  |  |  |  |  |  |  |  |  |  | 1 |  |
| 15 |  |  |  |  |  |  |  |  |  |  |  |  |  |  |  | 1 |

For state 1, the communication matrix is shown in Table 2 (empty rows indicate 0).

TABLE 2

| Communications between nodes during State 1 (in bytes) | | | | | |
|---|---|---|---|---|---|
|  | A | B | DCM | Billing | CRH | DRM |
| A |  | 128 |  |  |  |  |
| B |  |  |  |  |  |  |
| DCM |  |  |  |  |  |  |
| Billing |  |  |  |  |  |  |
| CRH |  |  |  |  |  |  |
| DRM |  |  |  |  |  |  |

The value of 128 bytes is derived from the annotated values at 716. Similarly, for state 1, a delay and probability matrix would yield 15 msec and 0.01 respectively in the entry at (A,B) in the tables and zeros elsewhere. For state 1 and Node A, the storage requirement is 50 bytes and the computation requirement is 15 cycles. An input from the user has specified an application arrival rate of 300/sec at 718.

In this example, state reduction is not needed. However, aggregation opportunities, though not existing in this scenario, may be present in such deterministic applications. For example, if message 15 ("charges") to Billing had been preceded by two distinct calls to Billing that first validated the user's identity, and then checked for past due payments (that is, message 14*b*. "Check identity", and 14*c*. "Check for past-due payments") then messages 14*b*,14*c*, and 15 may be aggregated as described previously. In one embodiment, aggregation steps are optional and left to a user preference.

Figure 8:
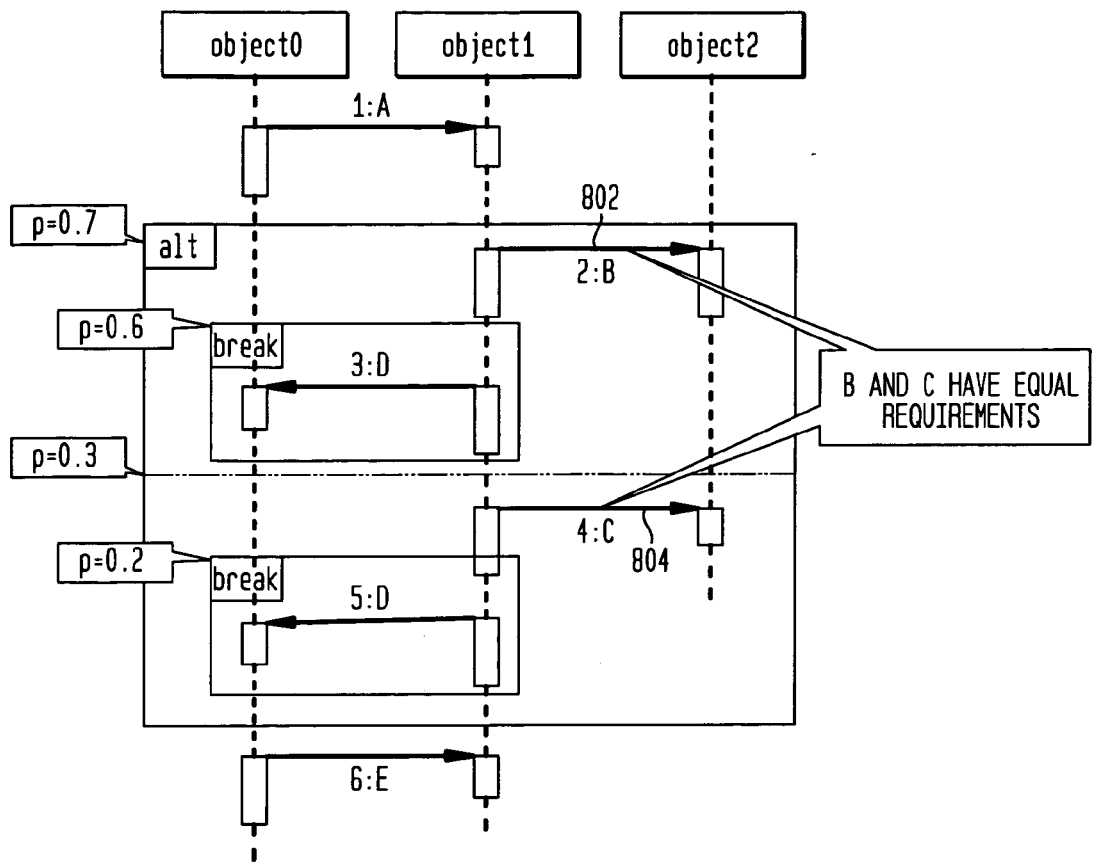
FIG. 8 illustrates an example of a sequence diagram in which a non-deterministic finite automaton (NFA) may be created.

FIG. 8 illustrates an example of a sequence diagram in which a non-deterministic finite automaton (NFA) may be created. In FIG. 8, B 802 and C 804 have equal communication requirements. For example, they may represent a packetized message with the same length and characteristics, but with different content payloads (for example, one carries an "ACK", the other a "NACK"). The extracted state transition matrix is shown in Table 3. In the matrix, states correspond to message names and associated communications.

TABLE 3

| STP | A | B | C | D | E | Z |
|-----|---|---|---|---|---|---|
| I | 1 | | | | | |
| A | | .7 | .3 | | | |
| B | | | | .6 | .4 | |
| C | | | | .2 | .8 | |
| D | | | | | | 1 |
| E | | | | | | 1 |

Figure 9:
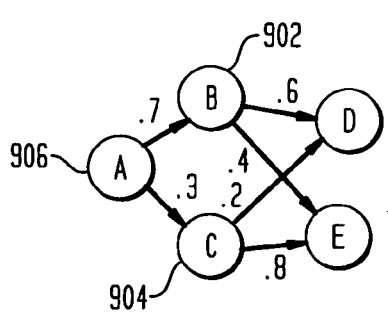
FIG. 9 is a diagram illustrating states and their transitions representing the sequence diagram of FIG. 8 in one embodiment.
Figure 10:
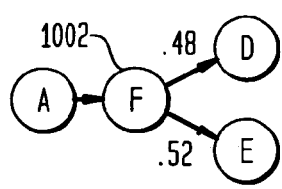
FIG. 10 is a diagram illustrating reduced states of FIG. 9.

The states and their transitions can be represented as shown in FIG. 9. In this example, initial state I and final state Z are not shown. Since states B 902 and C 904 share the same communications and other non-functional characteristics such as storage and computing, and a common predecessor A 906, they can be merged into a new state F 1002 with the same characteristics as B as shown in FIG. 10. The transition probability from A to F is 1. From F to D it is (0.7)(0.6)+(0.3)(0.2)=0.48 (that is, the sums of the all the probability paths from A to D through the former B and C states). From F to E it will be 1−0.48=0.52. The state diagram is shown in Table 4.

TABLE 4

| STP | A | F | D | E | Z |
|-----|---|---|---|---|---|
| I | 1 | | | | |
| A | | 1 | | | |
| F | | | .48 | .52 | |
| D | | | | | 1 |
| E | | | | | 1 |

Figure 11:
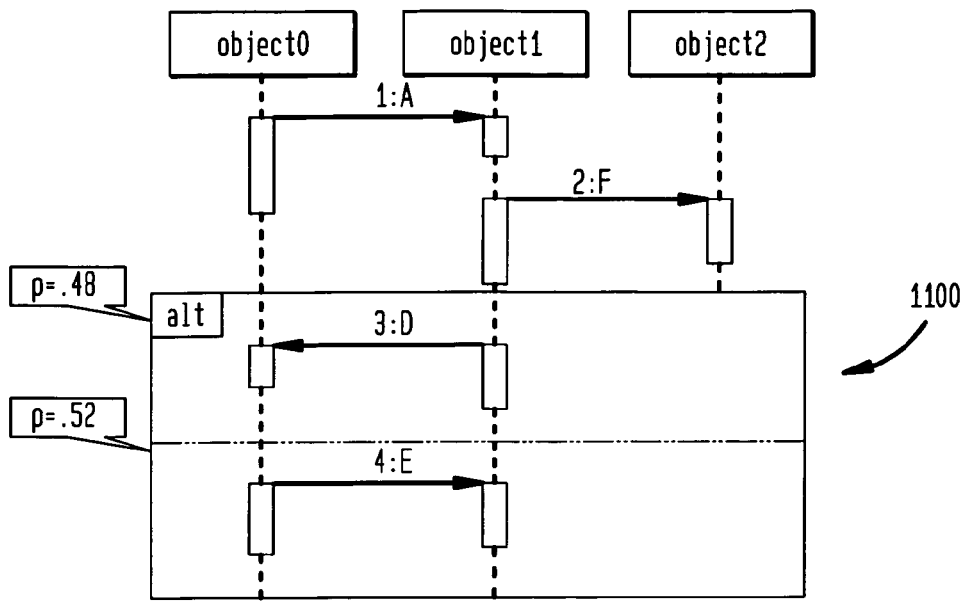
FIG. 11 illustrates a reduced or simplified sequence diagram constructed from the merged state diagram.

In addition, a new sequence diagram may be reverse-engineered and constructed from the state diagram. FIG. 11 illustrates a reduced or simplified sequence diagram constructed from the merged state diagram. The system and method of the present disclosure in one embodiment has reduced a sequence diagram to a more compact and virtually equivalent one by applying state reduction and analysis. The analyst may then read and understand the reductions that were made by the system and may, for example, now have an option to draw more compact sequence diagrams. Thus, in one embodiment, the system and method of the present disclosure may be used to reduce and simplify diagrams. Further, the analyst may use various algorithms on the state diagram to analyze the impact of the service on the network.

In one embodiment of the present disclosure, the method and system described above may be applied to an IP Multimedia Subsystem (IMS) for estimating the load and stress on IMS core network components. The method and system may characterize a network service or application by means of annotated sequence diagrams, and derive analytical models that allow a user to investigate the load on different network elements imposed by the application. The method and system of the present disclosure brings together software models that capture the semantics of the application and analytical models that describe the application in terms of states and state transitions. Software models capture the semantics of application sessions, such as the Unified Modeling Language 2.0 (UML), proceeding from the specification of a sequence diagram of the events that could occur in a session of the application. Analytical models specified by Markov chains describe application sessions with respect to states and state transitions. Typically, the former are used by software engineers to define and describe services and protocols, and the latter by mathematicians and analysts. In one embodiment, the method and system of the present disclosure converts a sequence-diagram representation of an application to a finite-state semi-Markov process (a Markov process in which the sojourns in the states are not necessarily of exponential distribution) that describes the unfolding of events in a session of the service. By considering the resources required in each state, and by examining the probabilistic evolution of the states, various resource requirements imposed by the service may be estimated.

Figure 20:
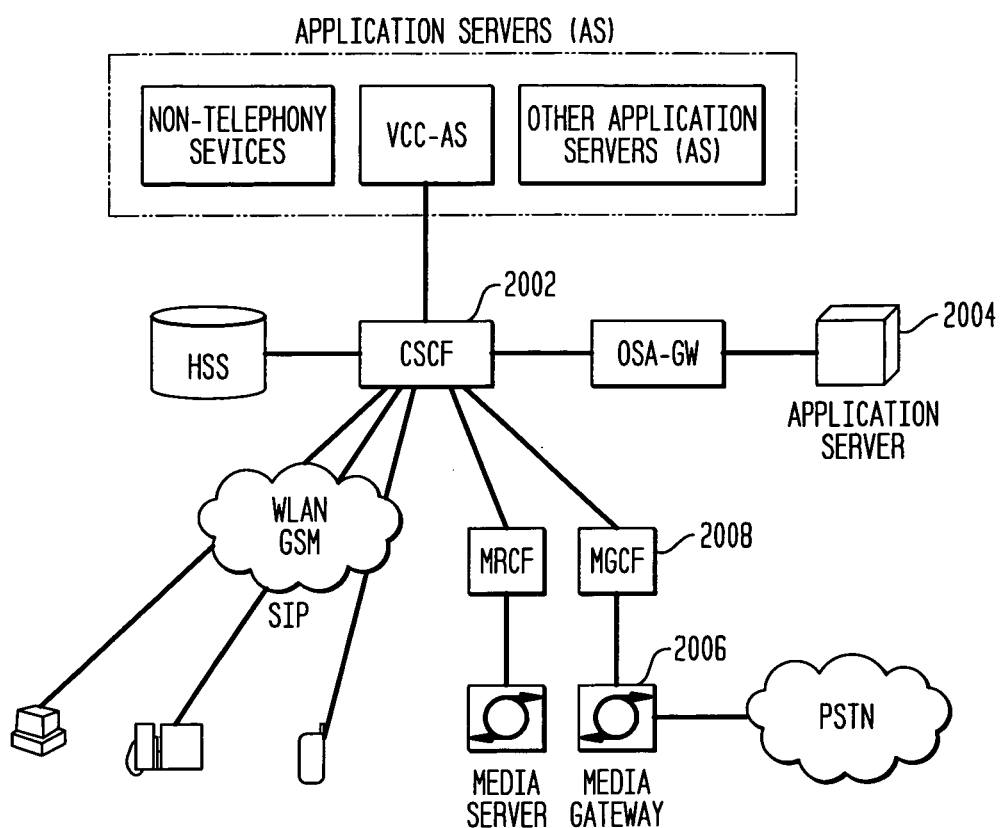
FIG. 20 illustrates a simplified IMS architecture.

Briefly, the IP Multimedia Subsystem (IMS) enables operators and service providers to control bearers, sessions and charging of multimedia services using Internet protocols. IMS is seen as the main "enabler" to fixed-mobile convergence, as IMS provides services independently of the access technology and enables a smooth interoperation between wireless and wireline networks, mobile and fixed networks and circuit-switched and packet-switched networks. A simplified IMS architecture is shown in FIG. 20. IMS encompasses many components including the following. Call Session Control Function (CSCF) 2002 provides various types of session control for users accessing IMS networks; a SIP stack is a capability at the core of its functionality. In this example architecture, there are three different types of CSCF: Proxy, Interrogating, and Serving Call Session Control Function ((P)(I)(S)-CSCF). Application Server (AS) 2004 is a server running several applications in a reliable, scalable fashion; shared by client. Media Gateway (MGW) 2006 and Media Gateway Control Function (MGCF) 2008 function as a translation unit acting between disparate communication network types.

In the example, UML Sequence Diagrams (SeqD) is used as a tool for describing the events of an application session. Alternately or additionally, other modeling tools may be used to represent an application or a service session, for example, into a sequence diagram. Briefly, the UML is an Object Management Group (OMG) specification that helps software developers communicate, design and validate large, complex, software systems. UML Sequence Diagrams (SeqD), a type of timing diagram showing sequential flow of messages between system actors, are typically used to document how a system will behave in certain use-cases. The SeqD is a useful stepping stone in system design as it provides a somewhat formal and detailed view of system behavior and is easy to read. SeqD notation is widely used and understood by engineers and planners; however, no method exists for the systematic addition of non-deterministic annotation. For example, while one can draw a message arrow between IMS components such as a UE and S-CSCF, one cannot easily declare the processing, bandwidth, and storage implications of such a message. Typically, such declarations and analysis are done offline and/or in other, separate, tools.

In one embodiment of the present disclosure, the method and system of the present disclosure allows users to annotate or attach information to the SeqD components, for instance, by utilizing for example, tools such as XML schema and/or ontology tools. UML admits a canonical XML format (called XMI). The W3C Web Ontology Language (OWL) is application and extension of Resource Description Format (RDF) Schema (and others) and allows the creation of rich collections of classes, properties, individuals, and their interrelationships. OWL admits a description logics representation and, in turn, enables various types of reasoning over its assertions. Reasoning over OWL may reveal new implicit assertions beyond what was explicitly declared. The OWL syntax and tools allow rich expression of interrelated assertions and (sometimes highly abstract) concepts. The method and system of the present disclosure may utilize both XML Schema and OWL syntaxes for annotating the sequence diagrams.

Figure 21:
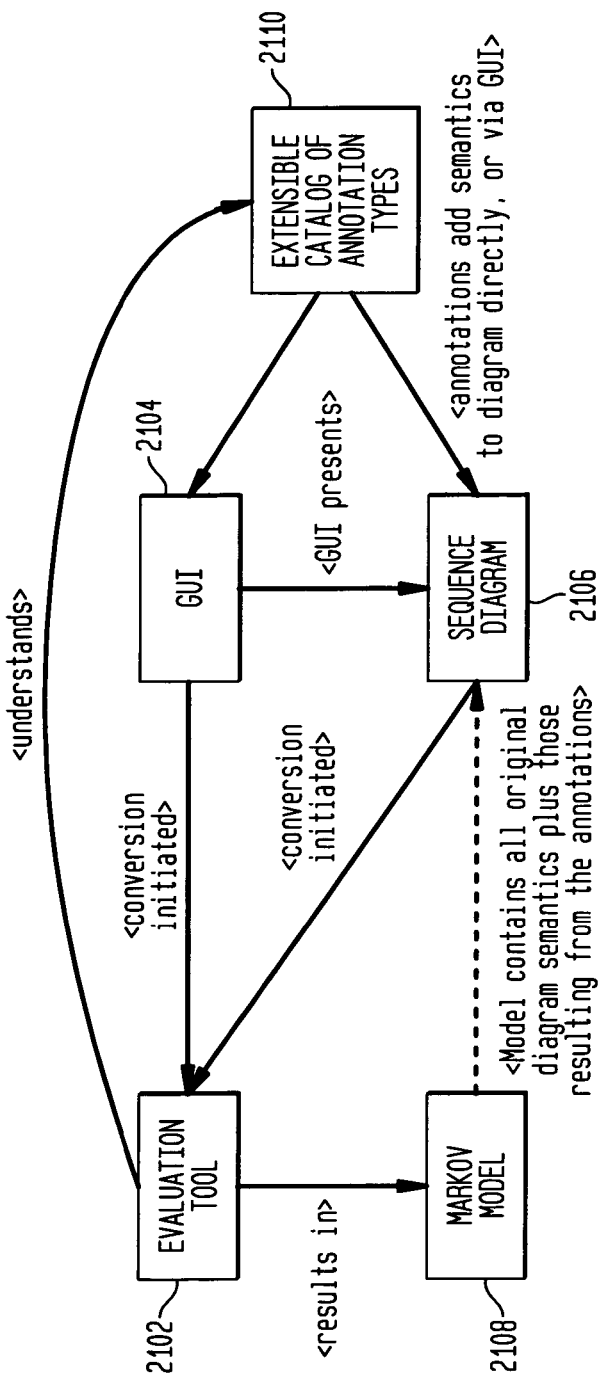
FIG. 21 is a block diagram illustrating an overview of various components in one embodiment of the present disclosure.

FIG. 21 is a diagram illustrating the system components of the present disclosure in one embodiment. A system may include an evaluation module 2102 that performs various functions as described with reference to FIG. 1 and FIG. 4. In one embodiment, the evaluation module 2102 may use a graphical user interface (GUI) module 2104 to help users and operators to annotate the sequence diagram 2106 that models or provides a framework for the service or system being analyzed, for instance, using various semantic and ontology tools such as XMI and OWL, for example, according to various definitions specified in a catalog of annotation types 2110. In another embodiment, a sequence diagram 2106 may be annotated directly without a GUI, for instance, by entering the appropriate fields into a formatted file such as an XML formatted file or the like, which for instance can be interpreted by the evaluation tool 2102. Annotating the sequence diagrams allows semantics to be added to the sequence diagram 2106. The evaluation module 2102 extracts the entered annotations and derives a Markov model 2108 using the annotations. The resulting model 2108 in one embodiment includes the original diagram semantics plus those derived from the annotations as a mathematical form ready to be analyzed.

In one embodiment, a modeler (e.g. engineer or CTO) draws a valid UML2.0 sequence diagram(s) that corresponds to a typical session of a proposed service (e.g. a call set-up or handover). The modeler may use a GUI to annotate individual artifacts on the diagram with instances of the pre-defined grammar. The pre-defined grammar is preferably extensible in one embodiment. In one embodiment, the resulting annotations comprise relevant (and probabilistic) information that the modeler knows a priori about this service. Through a number of sub-steps in the conversion to statistical model-approach the system of the present disclosure converts the diagram into a semi-Markov process and allows the analyst to obtain results on resource requirements to support the application.

In one embodiment, Markov model and its parameters are derived from the annotated sequence diagram describing the service session. The initial pass within this phase assigns a state to each labeled SeqD message, for example, including its size, computation required, etc. Subsequent passes derive computation, bandwidth, and storage events at each node and each link in each state. Final passes reduce the state space as required.

Figure 12:
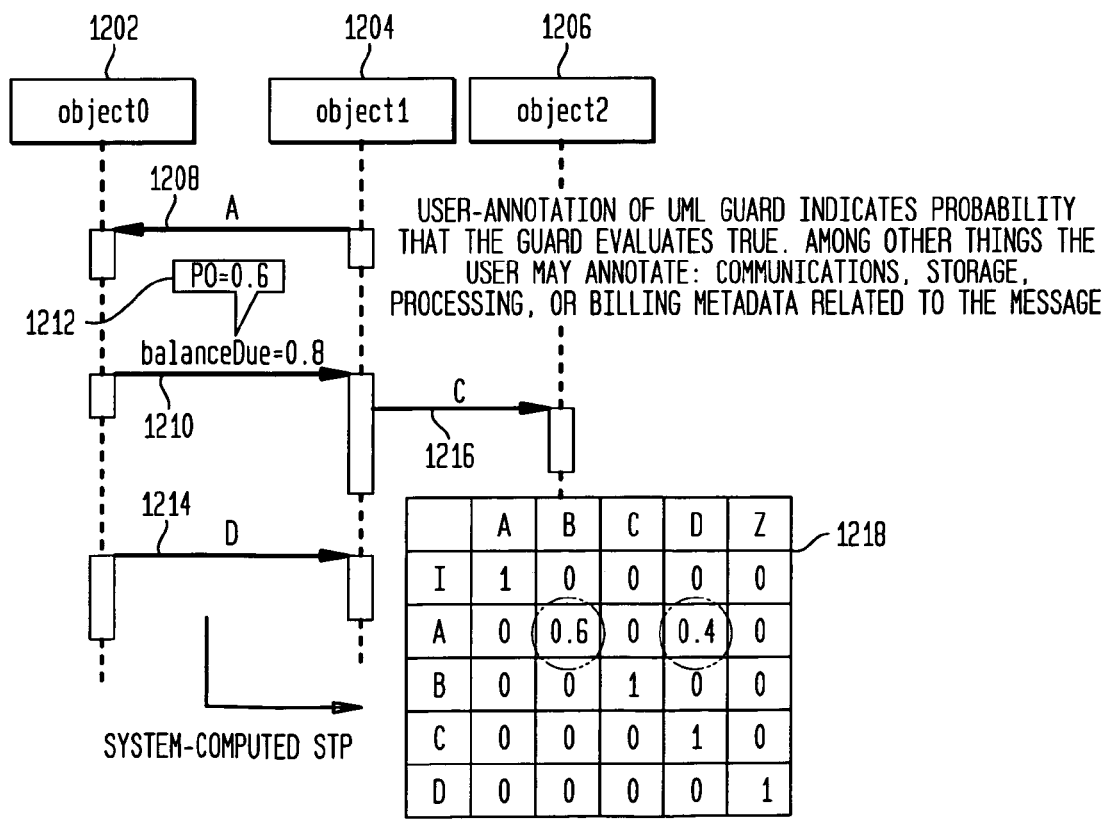
FIG. 12 is an example of a sequence diagram illustrating a break fragment.

FIG. 12 is an example of a sequence diagram in one embodiment. In the example shown in FIG. 12, a break fragment is analyzed. Break adds an alternative path within the SeqD followed by a transition to the end state (i.e. termination). In FIG. 12, nodes object0 1202, object1 1204, object2 1206 are derived. Since the transition from A 1208 to B 1210 is dependent on the annotated probability (p=0.6) 1212 and the next independent message is D 1214, the probability of transition from A to D will be 1−p=0.4. Additionally, the semantics of the break fragment require that the SeqD terminates after message C 1216. Therefore C's next state is always the termination state. FIG. 12 also illustrates the derived state transition probabilities 1218 where states I and Z are the initial and terminating states, respectively. In the following description, this Markov model derivation is applied to a "VCC user" scenario in which a multi-mode wireless phone moves between GSM and WLAN sessions.

Although IMS control flows are complex, modeling tools such as the UML2.0 specification allows the modeler to capture and notate nested flows and various other intricacies of sequence flows as shown in FIG. 12. As mentioned, however, such UML specifications almost never encompass computing, storage or communication quantities. The system and method of the present disclosure enables a network planner to leverage sequence diagrams picturing IMS flows corresponding to session migration between WLAN and GSM technologies and better understand the processing load on key components—for example, the S-CSCF. It is important for the Network Operator (traffic engineer) to understand the processing loads on these servers in order to quantify the effects of various IMS signaling traffic. Given certain arrival rates of applications, such traffic could be non-trivial.

In the example scenario described, a user has a dual mode mobile phone—for example, one that has both WLAN and GSM interfaces. A session is depicted that can switch between two networks—for example, one that begins on a WLAN interface on the mobile phone, and subsequently moves to a GSM network. Teardown and setup happen as a result. A single "moving" session is considered and the load it imposes on the S-CSCF is investigated. Then, the situation corresponding to the sessions arriving at a certain rate into the network is considered and the load as a function of the arrival rate is examined. With the analytical model created by the system and method of the present disclosure, a user such as a network operator may pose various "what-if" questions to the analytic engine.

Figure 13:
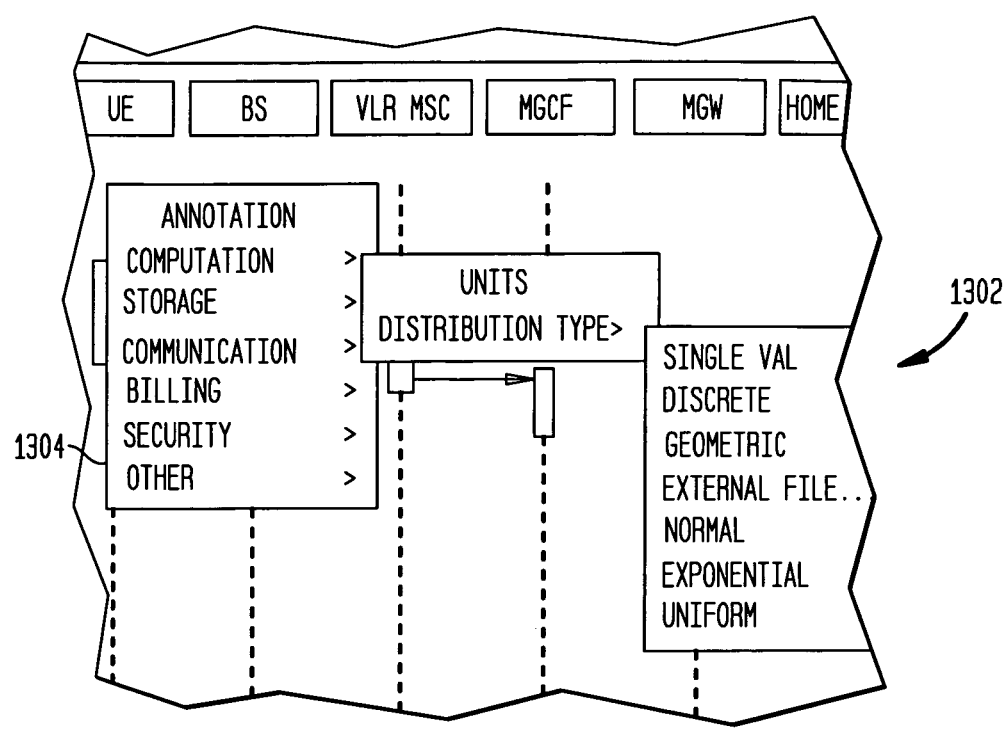
FIG. 13 is an example of a user interface pop-up window for allowing a user to annotate a sequence diagram in one embodiment.

FIG. 13 is a diagram illustrating a sequence diagram with a graphical user interface capability that allows annotation of various diagram elements in one embodiment. FIG. 13 focus on the computation load annotation for example only, however, other attributes may be attached to the diagram. FIG. 13 illustrates this concept by showing a popup window 1302 that appears when a modeler chooses a sequence diagram element to annotate. For example, the modeler may choose the S-CSCF at the point where an incoming message arrives and annotate it such that the system understands that the incoming message causes x transactions to occur, where x is a normal distribution around 5, etc.

FIG. 13 also illustrates the various dimensions of attributes such as computational (e.g. processing), storage (e.g. RAM and disk space), communications (e.g. message sizes), billing (e.g. costs of actions to operator and user), security (security requirements that need to be met) 1304. In this example, an operator may choose to annotate computational aspects of the message. The operator supplies units and a distribution to quantify such computation (e.g. a normal distribution, or simply a discrete value); values are entered values through input forms as needed. In embodiment, underlying the pop-up options is a more formal representation of the allowable annotations and their interrelationships. This "annotation domain" may be modeled using a set of logical UML classes and mapped to an OWL representation. Thus, in this example, an annotation is a valid instance of an OWL ontology.

Figure 14:
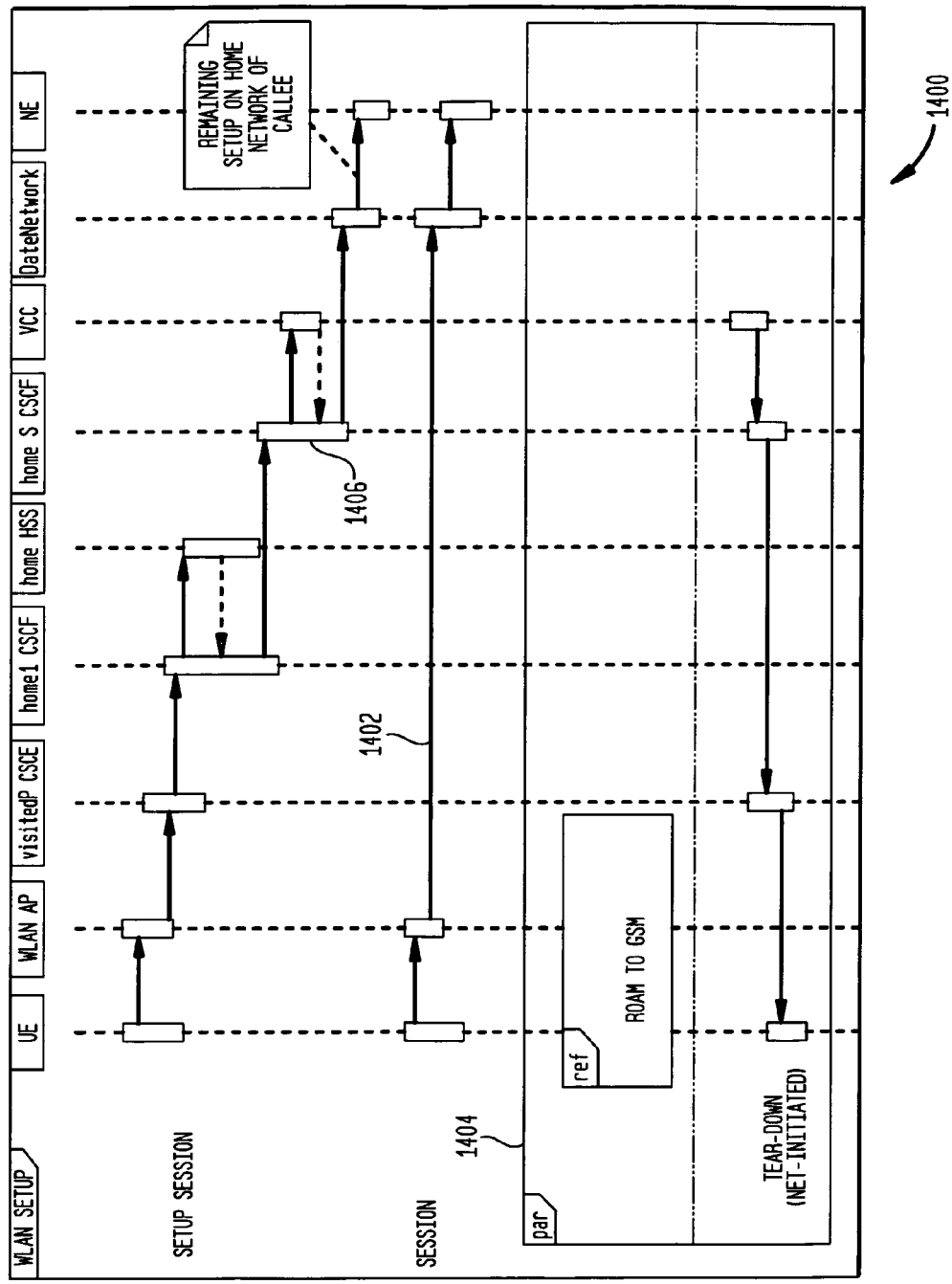
FIG. 14 illustrates in one embodiment the IMS signal flows that correspond to call initiation in the WLAN, possible migration to the GSM network, and teardown, for example, either because of the hand-over or because of call termination.
Figure 15:
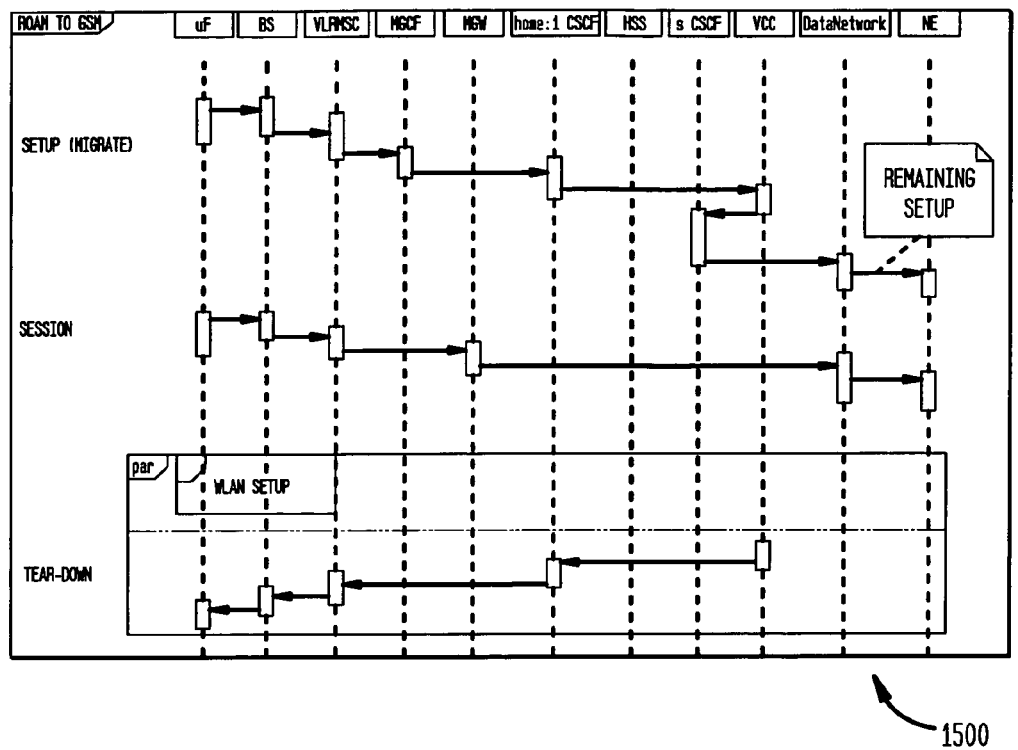
FIG. 15 illustrates in one embodiment the corresponding flows for call initiation in the GSM, with possible migration to the WLAN.

In the general example scenario considered, a mobile user initiates a call on one of the networks. During the holding time of the call, the moving user may switch back and forth between the two networks before the call ends. FIG. 14 illustrates in one embodiment a sequence diagram 1400 of the IMS signal flows that correspond to call initiation in the WLAN, possible migration to the GSM network, and tear-down, for example, either because of the hand-over or because of call termination. FIG. 15 illustrates in one embodiment the corresponding flows for call initiation in the GSM, with possible migration to the WLAN. A specific instance of the general example scenario, for example, may be as follows:

1. User initiates a VoIP call using a WLAN interface (see FIG. 14)
2. Call is setup and commences (see FIG. 14)
3. User moves to GSM network (see FIG. 14)
4. Call is migrated to GSM network (see FIG. 15)
5. Call continues on GSM Network (see FIG. 15)
6. Call terminates in the GSM OR user moves back to WLAN network and call is migrated (go to step 1)

In this example, it is assumed here that the destination of the call initiated by the mobile user is a fixed device. Also, the IMS flows for a call tear-down may be slightly different for a handed-over call and for a call that terminates. Similarly, the IMS flows for termination may depend on whether the termination is initiated by the roaming user or by the fixed device. In one embodiment, variations may be handled in a straight-forward manner by introducing additional states in the sequence diagrams. In this example, it is assumed that all these cases of tear-down involve the same set of flows.

FIGS. 14 and 15 illustrate UML2.0 sequence diagrams (1400, 1500) describing IMS flows initiated by the steps 1-6 above. In particular, FIG. 14 illustrates the initiation of a VoIP call in an IMS-compliant WLAN environment. In it the User Equipment (UE) sets up a call using SIP via the Access Point (AP) and visited Proxy Call Session Control Function (CSCF). The SIP message is forwarded to the home network Interrogating-CSCF, profiled information is gathered from HSS, and the Voice Call Continuity (VCC) is registered with. The SIP INVITE is propagated across the data network through various Network Elements (NE) to the other user. The middle of FIG. 14 shows the flow of data 1402 through the established session. The bottom of FIG. 14 features a so-called parallel fragment 1404 that indicates that the two blocked in flows may happen in parallel. The modeler of this UML is stating that for analysis purposes it is not important if the WLAN session teardown is considered as happening before, after or during the setup of the new session on the GSM technology.

In FIG. 15 an analogous IMS flow is depicted which represents the moving-to-GSM flow indicated in FIG. 14 by the reference fragment called "Roam to GSM". In other words, when the WLAN session is to move, this sequence of flows is kicked off. It depicts the flow of messages through the MSC, Media Gateway (MGW), I-CSCF, HSS, VCC and finally the data network to setup the GSM call. The session begins once it is setup (meanwhile the WLAN session may be terminated as shown in FIG. 14). In this example, the VCC does not play a role in the GSM session.

Once the interrelated sequence diagrams have been laid out by the Operator (e.g. the modeler), the system and method of the present disclosure allow the annotation of various non-functional attributes of messages and actors on the diagrams. By clicking on the diagram the modeler has the opportunity to choose the annotation type (for example, shown in FIG. 13). For example, when focusing on the computation load of IMS flows on the VCC Server, the modeler may click on the focus of control bar which begins when the S_CSCF messages with VCC (FIG. 14, 1406). The modeler would then quantify the computation by using the pop-ups. Examples of the types of diagram artifacts to which annotations can be attached may include messages, endpoints, foci of control, guards, and fragments.

Figure 16:
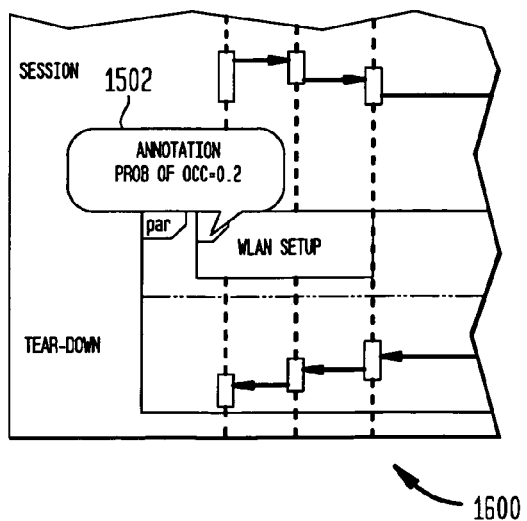
FIG. 16 illustrates an example of attaching or annotating probabilistic information to parts of a message flow in one embodiment.

FIG. 16 illustrates the notion of attaching probabilistic information to parts of the message flow from FIG. 15 (GSM to WLAN moving). In FIG. 16, the operator indicates that the probability of moving to WLAN from GSM is 0.2 as shown at 1502. Similarly, the probabilities of moving from WLAN to GSM and that of starting up in the GSM or WLAN network would be added. Other information may include arrival rate specifications.

At this point in the example, the modeler has drawn or imported the UML sequence diagrams depicting the flows of interest. In particular, the modeler is interested in the effects of IMS protocols on a particular node (e.g. VCC or CSCF) so the sequence diagrams include prototypical flows containing these actors. The modeler has annotated the actors and messages with the non-functional data of interest. In this example, the focus is on computational requirements of the node. For example, the system and method of the present disclosure understands that the computational load on the VCC after a particular message arrives is "1 transaction" (i.e., causes a single transaction to run), for instance, from the annotations to the sequence diagram. With its novel approach of combining both the sequential and abstract quantitative information about protocols, the system and method of the present disclosure in one embodiment enabled a user to represent an application session and its transaction flows in a sequence diagram having annotation of information. The annotated sequence diagrams then may be used to derive a Markov model. The Markov model may be used for the analysis of the computational requirements using mathematical techniques.

In this example, IMS use-case is modeled in which someone with a terminal device that can talk both to a WLAN and to a GSM access network. In this case the user initiates a call using one of the two access methods. The user continues the call for some length of time. During the length of the call, it may switch back and forth between the two access methods. Eventually, the call terminates. One is interested in determining the load on IMS components that results from various rates of call initiation, various rates of switching access methods, and various call holding times. In one embodiment, load is measured in numbers of "transactions per second". A semi-Markov model may be derived from the use-case sequence diagrams with ten states as follows.

State 1. The user initiates a call on the WLAN. This is followed by state 2.
State 2. The user continues the call on the WLAN. This may be followed by states 3, 4, or 5.
State 3. The user switches the call from the WLAN to the GSM network. This is followed by state 7.
State 4. The user terminates the call on the WLAN. This is a final state.
State 5. The user's call on the WLAN is terminated from the other end. This is a final state.

State 6. The user initiates a call on the GSM network. This is followed by state 7.

State 7. The user continues a call on the GSM network. This may be followed by states 8, 9, or 10.

State 8. The user switches the call from the GSM network to the WLAN. This is followed by state 2.

State 9. The user terminates a call on the GSM network. This is a final state.

State 10. The user's call on the GSM network is terminated from the other end.

This is a final state.

FIG. 17 illustrates the states in the Markov model derived from the sequence diagrams. In this example, the parameters of the model are the rate of call initiation $\alpha$; the probabilities $p_{0,1}$ and $p_{0,6}$, that a call will be initiated on the WLAN or on the GSM network; the transition probabilities $p_{2,3}$, $p_{2,4}$, and $p_{2,5}$, and $p_{7,8}$, $p_{7,9}$, and $p_{7,10}$, at the two states that permit branching (of the rest of the transition probabilities, $p_{1,2}=p_{3,7}=p_{6,7}=p_{8,2}=1$, and all others are zero); and the loads $l_{i,j}$ (measured in transactions) on IMS component j and the acceptable durations $d_i$ for the states i that impose a load on the IMS components (1, 3, 4, 5, 6, 8, 9, and 10).

The values of these parameters may be from annotations in the sequence diagram or given as separate inputs for the scenarios. From the transition probabilities, the expected number of visits $v_i$ a call will make to state i before termination is determined, using methods standard for a Markov chain. Under the assumption that calls are initiated according to a Poisson process, the number of calls in any state i at a given instant is a Poisson random variable $n_i$. With the $v_i$, the arrival rate $\alpha$ and the state durations $d_i$ the mean of $n_i$ can be computed.

$$En_i = \alpha v_i d_i$$

With this and the loads the mean and variance of the transactions per second required at any given instant from component j can be computed.

$$load_j = \sum_i \frac{l_{i,j}}{d_i} n_i$$

$$E(load_j) = \alpha \sum_i l_{i,j} v_i$$

$$\text{Var}(load_j) = \alpha \sum_i \frac{l_{i,j}^2}{d_i} v_i$$

Although the actual distributions of these loads are weighted sums of Poisson random variables, it can be useful to approximate them by normal random variables with the same means and variances. For example, the $99^{th}$ percentile can be computed, to indicate how much capacity the ISM system components need to be able to handle this kind of customer load reliably.

The use of this model to compute loads on the S-CSCF at various arrival rates is illustrated herein. Suppose, in a region under study, calls have a probability $p_{0,1}$ of 0.7 of being initiated through the WLAN, and a probability $p_{0,6}$ of 0.3 of being initiated through the GSM network. Suppose a WLAN call has probability $p_{2,3}$ of 0.4 of being handed over to GSM, probability $p_{2,4}$ of 0.3 of being terminated by the mobile user, and probability $p_{2,5}$ of 0.3 of being terminated by the other end. Suppose a GSM call has probability $p_{7,8}$ of 0.2 of being handed over to the WLAN (see FIG. 16), probability $p_{7,9}$ of 0.4 of being terminated by the mobile user, and probability $p_{7,10}$ of 0.4 of being terminated by the other end. Suppose, in addition, call initiations and handovers are each required to take no more than 1 second to progress through the S-CSCF.

State parameters then can be populated as shown in FIG. 18. Loads (in transactions) are from the sequence diagrams and are for the S-CSCF. Durations (in seconds) are by the suppositions above. Average numbers of visits to a state per call are derived from the probabilities that were supposed.

For a call arrival rate of $\alpha$, a mean S-CSCF load of 4.761 $\alpha$ transactions per second is computed, with a variance of 15.335$\alpha$. One can plot the mean and $99^{th}$ percentile of the normal approximation to this random load as a function of the arrival rate in the FIG. 19. The results show, for example, that to serve a call arrival rate of 20/sec, with a success rate of 99%, with the assumed probabilities of call-origination in the two networks and of handovers between them, the S-CSCF needs to be able to handle 136 transactions/sec.

In one embodiment, the mathematical model produced can be used to evaluate and estimate various resource requirements in supporting different types of services and components of services in an integrated service environment. Various input parameters may be entered and used to estimate resource requirements for the different types of services. These parameters in an exemplary embodiment are entered using the annotation schema as described above. Examples of different input parameters include but are not limited to message size, latency, billing, and security. The annotations together with the corresponding sequence diagram describe the integrated service's interactions with its environment and attributes related to different components in the service such as communication, security, billing, etc. This integrated description allows for the service analysis from different points of view, for example, network, security, etc. In one embodiment, a library of analytic procedures may be modeled after a set of representative service types. The estimation results may then be plotted for different service types. In addition the values of the service variables may be varied to analyze and estimate the impact of, for example, deploying new services.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for modeling and evaluating impact on service components, comprising:
    a processor operable to present a UML sequence diagram describing service components and flow of transactions between the service components, the processor further operable to enable entering information associated with the UML sequence diagram in a distinct and separate step from generating the UML sequence diagram, the processor further operable to derive a Markov model from the UML sequence diagram and entered information, wherein the Markov model includes a plurality of states and state transition probabilities representing the flow of transactions between the service components; and wherein the processor is further operable to automatically compute the state transition probabilities from the sequence diagram.

2. The system of claim 1, further including a user interface operator to prompt for and receive the information associated with the sequence diagram.

3. The system of claim 1, further including a data model associated with one or more elements in the sequence diagram.

4. The system claim 1, wherein the processor is further operable to enable generating the sequence diagram.

5. The system of claim 1, wherein the processor is further operable to reverse engineer the Markov model and create a new sequence diagram.

6. The system of claim 1, wherein the processor is further operable to optimize the Markov model.

7. The system of claim 1, wherein the processor is further operable to minimize the plurality of states.

* * * * *

UNITED STATES PATENT AND TRADEMARK OFFICE
CERTIFICATE OF CORRECTION

PATENT NO. : 8,554,825 B2  
APPLICATION NO. : 11/441531  
DATED : October 8, 2013  
INVENTOR(S) : Falchuk et al.

Page 1 of 1

It is certified that error appears in the above-identified patent and that said Letters Patent is hereby corrected as shown below:

In the Drawings

In Fig. 34, Sheet 20 of 30, below "STP", in Line 1, delete "1" and insert -- I --, therefor.

In Fig. 37, Sheet 22 of 30, delete Tag "3902" and insert Tag -- 3702 --, therefor.

In Fig. 37, Sheet 22 of 30, delete Tag "3904" and insert Tag -- 3704 --, therefor.

In Fig. 37, Sheet 22 of 30, delete Tag "3906" and insert Tag -- 3706 --, therefor.

In the Specification

In Column 7, Line 33, delete "message arc" and insert -- message --, therefor.

In Column 13, Line 18, delete "p=0.6 (0.8)." and insert -- p=0.6*(0.8). --, therefor.

In Column 16, Line 47, delete "$p_{fe}=p_{ab}p_{be}+p_{a}p_{ce}.$" and insert -- $p_{fe}=p_{ab}p_{be}+p_{ac}p_{ce}.$ --, therefor.

In Column 25, Line 31, delete "rateda" and insert -- rate α, --, therefor.

In Column 26, Line 9, delete "αtransactions" and insert -- α transactions --, therefor.

In the Claims

In Column 27, Line 20, in Claim 4, delete "system" and insert -- system of --, therefor.

Signed and Sealed this  
Thirty-first Day of March, 2015

Michelle K. Lee  
*Director of the United States Patent and Trademark Office*